US012436695B1

(12) United States Patent
Symes et al.

(10) Patent No.: US 12,436,695 B1
(45) Date of Patent: Oct. 7, 2025

(54) RE-ACCESSING DATA

(71) Applicant: Arm Limited, Cambridge (GB)

(72) Inventors: Dominic Hugo Symes, Cambridge (GB); Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/778,193

(22) Filed: Jul. 19, 2024

(51) Int. Cl.
*G06F 3/06* (2006.01)
(52) U.S. Cl.
CPC .......... *G06F 3/0631* (2013.01); *G06F 3/0604* (2013.01); *G06F 3/0673* (2013.01)
(58) Field of Classification Search
CPC ..... G06F 3/0631; G06F 3/0604; G06F 3/0673
See application file for complete search history.

(56) References Cited

U.S. PATENT DOCUMENTS

| | | | |
|---|---|---|---|
| 2018/0322606 A1* | 11/2018 | Das | G06N 3/063 |
| 2019/0340010 A1 | 11/2019 | Lee et al. | |
| 2021/0294960 A1 | 9/2021 | Wu et al. | |
| 2022/0308872 A1 | 9/2022 | Foley | |
| 2023/0008622 A1 | 1/2023 | Boyd et al. | |

FOREIGN PATENT DOCUMENTS

| | | |
|---|---|---|
| KR | 102480287 B1 | 12/2022 |
| WO | 2022104176 A1 | 5/2022 |

OTHER PUBLICATIONS

Hsu Kuan-Chieh et al: "Accelerating Applications using Edge Tensor Processing Units", Nov. 14, 2021.
Taslynow Anuar et al: Tensor Yard: One-Shot Algorithm of Hardware-Friendly Tensor-Train Decomposition for Convolutional Neural Networks, Aug. 9, 2021.

* cited by examiner

*Primary Examiner* — Khoa D Doan
(74) *Attorney, Agent, or Firm* — EIP US LLP

(57) ABSTRACT

A processor comprising storage, execution circuitry and a handling unit configured to generate execution instructions to instruct the execution circuitry to execute a sub-operation to generate output data. The execution instructions comprise location data for prior data generated during execution of a prior sub-operation. The execution instructions instruct the execution circuitry to use the output data to update data stored within respective storage elements of a plurality of storage elements according to a predefined order, starting from an initial storage element determined based on the location data, so as to update the prior data using the output data. Further examples relate to a handling unit configured to generate execution instructions, comprising input location data, to instruct execution circuitry to re-read at least part of input data starting from an initial input storage element determined based on the input location data.

20 Claims, 7 Drawing Sheets

RE-ACCESSING DATA

BACKGROUND

Technical Field

The disclosure herein relates to processors.

Description of the Related Technology

An NPU (neural processing unit) is a specialized piece of hardware designed to optimize the performance of tasks related to artificial intelligence and neural networks. NPUs are increasingly common and are used for tasks such as autonomous driving and natural language processing, as well as face recognition, and voice recognition. NPUs typically include many processing units and associated control structures that allow efficient processing of the numerous calculations in neural network and machine learning workloads.

GPUs (graphics processing units) were originally developed for rendering graphics in video games and multimedia applications. GPUs typically have hardware that is optimized for graphics processing tasks such as rendering graphics, simulating physics (e.g. ray tracing), and other tasks that require parallel processing. GPUs may also find applications in processing tasks relates to artificial intelligence and neural networks.

Data processing techniques, such as neural network processing and graphics processing, involve the processing and generation of considerable amounts of data. It is desirable to efficiently handle data such as this.

SUMMARY

According to a first aspect of the present disclosure, there is provided a processor comprising: storage; execution circuitry; and a handling unit configured to: obtain task data that describes a task to be executed, the task comprising a plurality of operations representable as a directed graph of operations comprising operations connected by connections corresponding to respective logical storage locations, such that a connection associated with an output of an operation of the operations corresponds to a logical storage location; allocate a plurality of storage elements of a physical storage location of the storage to correspond to the logical storage location; generate location data indicative of a location of a given storage element of the plurality of storage elements within the physical storage location; generate execution instructions, comprising the location data, to instruct the execution circuitry to, after execution of a prior sub-operation of the operation comprising storing prior data in the physical storage location: execute a sub-operation of the operation to generate output data; and use the output data to update data stored within respective storage elements of the plurality of storage elements according to a predefined order, starting from an initial storage element of the plurality of storage elements determined based on the location data, so as to update the prior data stored in the physical storage location using the output data; and send the execution instructions to the execution circuitry.

According to a second aspect of the present disclosure, there is provided a processor comprising: storage; execution circuitry; and a handling unit configured to: obtain task data that describes a task to be executed, the task comprising a plurality of operations representable as a directed graph of operations comprising operations connected by connections corresponding to respective logical storage locations, such that an input connection associated with input data for input to an operation of the operations corresponds to a input logical storage location; allocate a plurality of input storage elements of an input physical storage location of the storage to correspond to the input logical storage location; generate input location data indicative of a location of an input storage element of the plurality of input storage elements within the input physical storage location from which reading of the input data started for execution of a prior sub-operation of the operations, prior to a sub-operation of the operations; generate execution instructions, comprising the input location data, to instruct the execution circuitry to, after execution of the prior sub-operation, execute the sub-operation comprising re-reading of at least part of the input data starting from an initial input storage element of the plurality of input storage elements determined based on the input location data; and send the execution instructions to the execution circuitry.

DETAILED DESCRIPTION

Figure 1A:
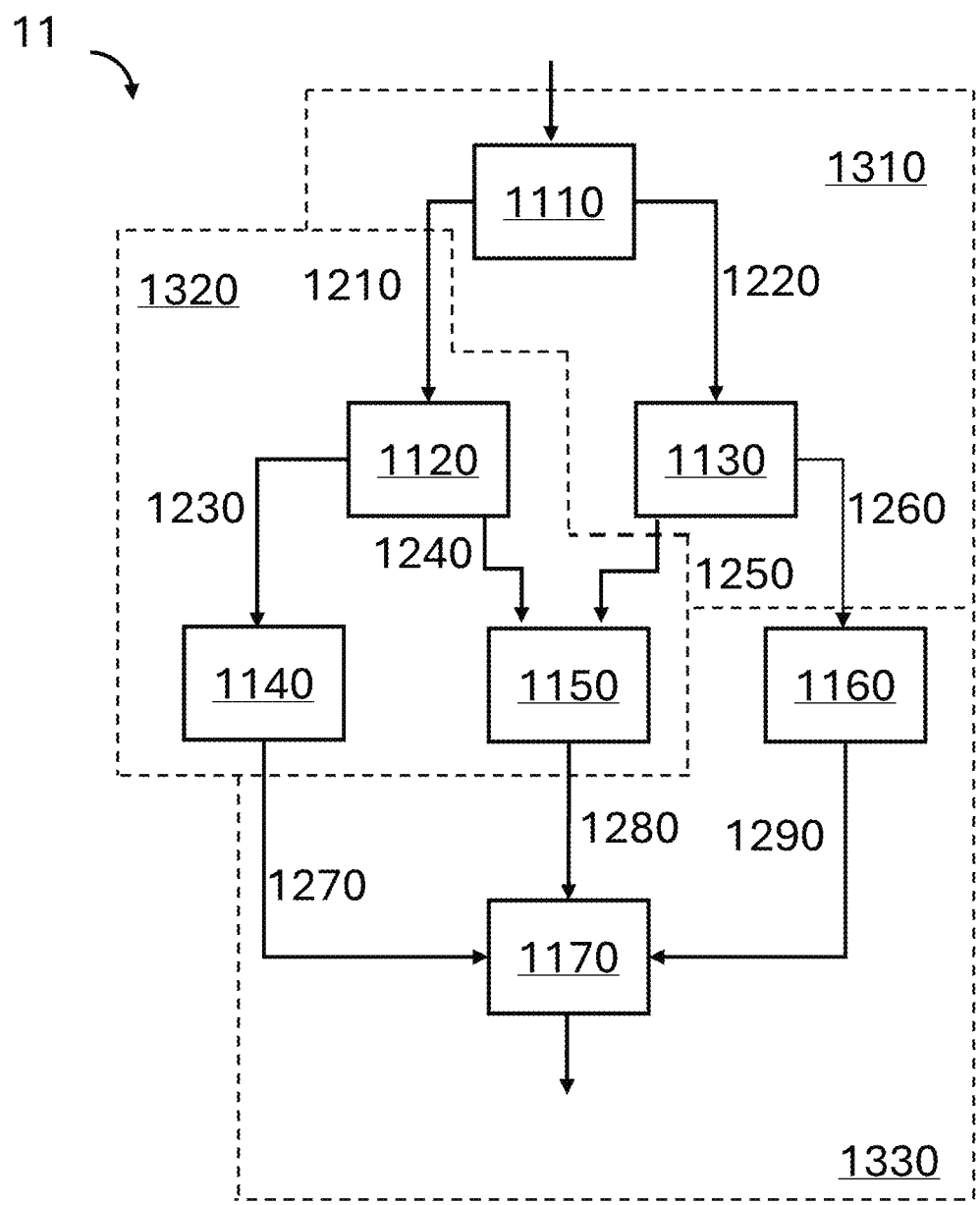
FIG. 1a illustrates an example directed graph.

Examples herein relate to a processor comprising storage, execution circuitry and a handling unit. The handling unit is configured to obtain task data that describes a task to be executed. The task comprises a plurality of operations representable as a directed graph of operations connected by connections corresponding to respective logical storage locations, such that a connection associated with an output of an operation of the operations corresponds to a logical storage location.

The handling unit is configured to allocate a plurality of storage elements of a physical storage location of the storage to correspond to the logical storage location and generate location data indicative of a location of a given storage element of the plurality of storage elements within the physical storage location. In this way, the handling unit can appropriately allocate storage elements, for example to utilize the available storage more efficiently.

After execution of a prior sub-operation of the operation comprising storing prior data in the physical storage location, the handling unit generates execution instructions, comprising the location data, to instruct the execution circuitry to execute a sub-operation of the operation to generate output data and use the output data to update data stored within respective storage elements of the plurality of storage elements according to a predefined order, starting from an initial storage element of the plurality of storage elements determined based on the location data, so as to update the prior data stored in the physical storage location using the output data. The handling unit then sends the execution instructions to the execution circuitry.

With this approach, the data stored in the physical storage location can be updated efficiently. This can allow more efficient use of input data upon which the data stored in the physical storage location is based. For example, the input data may remain in storage while a plurality of updates to the data stored in the physical storage location are computed and progressively written to the physical storage location. This may reduce a number of fetches of the input data from further storage, which may require greater power to access.

For example, for a matrix multiplication between two multi-dimensional tensors, the approaches herein may involve the calculation of outer products, which include taking the input data in turn and computing an intermediate result for each of many output locations, e.g. as an update to the data stored in a respective physical storage location corresponding to an output location. This may reduce memory fetches compared to a matrix multiplication approach involving computing each output one by one, fetching the input data each time. To determine an outer product in accordance with examples, the output is iterated over repeatedly to accumulate the various intermediate outer products into the output. The updating of the data stored with the respective storage elements, starting from an initial storage element based on the location data, allows the accumulation of a newly calculated intermediate outer product with the data stored in the correct storage element, to allow an outer product to be calculated efficiently. Reducing memory accesses in this manner may reduce power consumption and bandwidth of the processor.

The examples herein are suited for improving the efficiency of matrix multiplications, which typically consume a large amount of bandwidth but offer the potential for data re-use. However, it is to be appreciated that examples may be used to more efficiently perform other calculations that involve the updating of stored data, for example to update the stored data with intermediate results upon which a final result is based.

Further examples relate to a processor comprising storage, execution circuitry and a handling unit. The handling unit is configured to obtain task data that describes a task to be executed. The task comprises a plurality of operations representable as a directed graph of operations connected by connections corresponding to respective logical storage locations, such that an input connection associated with input data for input to an operation of the operations corresponds to an input logical storage location.

The handling unit is configured to allocate a plurality of input storage elements of an input physical storage location of the storage to correspond to the input logical storage location, and generate input location data indicative of a location of an input storage element of the plurality of input storage elements within the input physical storage location from which reading of the input data started for execution of a prior sub-operation of the operations, prior to a sub-operation of the operations. The handling unit generates execution instructions, comprising the input location data, to instruct the execution circuitry to, after execution of the prior sub-operation, execute the sub-operation comprising re-reading of at least part of the input data starting from an initial input storage element of the plurality of input storage elements determined based on the input location data and sends the execution instructions to the execution circuitry.

Re-reading of the at least part of the input data stored in the input physical storage location is for example more efficient than re-fetching the at least part of the input data from further storage for reading for the sub-operation. For example, power consumption and bandwidth may be lower than if the at least part of the input data is re-fetched from the further storage, which may require greater power to access. This approach can be effective for tasks involving significant re-reading of the same input data, such as matrix multiplications or other tasks involved in implementing a neural network.

Execution of a Directed Graph

Many data structures to be executed in a processor can be expressed as a directed graph. Examples of such data structures include neural networks which can be represented as a directed graph of operations that wholly compose the operations required to execute a network (i.e. to execute the operations performed across the layers of a neural network). A directed graph is a data structure of operations (which may be referred to herein as 'sections') having directed connections therebetween that indicate a flow of operations. The connections between operations (or sections) present in the graph of operations may be referred to as pipes (where a given connection is the sole tenant of a particular region of the storage unit, which region may be allocated to that connection statically or dynamically) or sub-pipes (where a given connection shares a particular region of the storage unit with at least one other connection). The allocation of particular storage elements within a given region of the storage unit to different respective sub-pipes that are tenants of the given region of the storage unit may be performed dynamically. A plurality of sub-pipes may belong to the same pipe as each other, which may be referred to as a multi-pipe. In such cases, the multi-pipe may be the sole tenant of the given region of the storage unit, which may itself be statically or dynamically allocated to the multi-pipe. A directed graph may contain any number of divergent and convergent branches. A directed graph may contain any number of divergent and convergent branches.

FIG. 1a illustrates an example directed graph 11 in which sections are interconnected by pipes or sub-pipes. Specifically, an initial section, section 1 (1110) represents a point in the directed graph at which an operation, operation A, is to be performed when executing the graph. The output of operation A at section 1, 1110, is connected to two further sections, section 2 (1120) and section 3 (1130) at which respective operations B and C are to be performed. The connection between section 1 (1110) and section 2 (1120) can be identified as a pipe with a unique identifier, pipe 1 (1210). The connection between section 1 (1110) and section 3 (1130) can be identified as a pipe with a different unique identifier, pipe 2 (1220). The output of section 1, which is the result of performing operation A on the input to section 1, can be provided to multiple subsequent sections in a branching manner.

More generally, sections in the directed graph may receive multiple inputs, each from a respective different section in the directed graph via a respective different pipe or sub-pipe. In FIG. 1a, sections 2 and 3 (1120, 1130) each write to different respective sub-pipes (1230, 1240, 1250, 1260) of the same pipe, pipe 3, which is a multi-pipe. Each sub-pipe has its own unique identifier, which also indicates the multi-pipe to which the sub-pipe belongs, where a multi-pipe is a pipe comprising at least one sub-pipe, as explained above. In this case, section 2 writes to sub-pipes 3.0 and 3.1 (1230, 1240) and section 3 writes to sub-pipes 3.2 and 3.3 (1250, 1260), where the numeral prior to the period indicates the identifier of the multi-pipe (3) and the numeral after the period indicates the identifier of the sub-pipe of the multi-pipe (0 to 3 in this case). A region of a storage unit is allocated to multi-pipe 3, and respective storage elements of the region of the storage unit are dynamically allocated to sub-pipes 3.0 to 3.3. In this example, different sections (sections 2 and 3) thus write to the same underlying physical region of the storage unit, via dynamically allocated sub-pipes.

The directed graph 11 of FIG. 1a also includes sections 4 to 6 (1140 to 1170) and pipes 4 to 6 (1270 to 1290). The sections 4 and 6 (1140, 1160) receive input data from sub-pipes 3.0 and 3.3 (1230, 1260) respectively, and write data to pipes 4 and 6 (1270, 1290) respectively. Section 5 (1150) in FIG. 1a receives a first set of input data via sub-pipe 3.1 (1240) from section 2 (1120) and a second set of input data via sub-pipe 3.2 (1250) from section 3 (1130) and writes data to pipe 5 (1280). Section 7 (1170) of the directed graph 11 receives input data from pipes 4 to 6 (1270 to 1290). Depending on the nature of the operation performed in a particular section and the dependencies of subsequent operations on the output of the operation, any number of input and output pipes may be connected to a particular section in the directed graph.

The directed graph can be represented by a number of sub-graphs each containing a subset of the sections in the graph. FIG. 1a illustrates an arrangement where the graph 11 is broken down into three sub-graphs 1310, 1320, and 1330 which can be connected together to form the complete graph. For example, sub-graph 1310 contains sections 1 and 3 (1110 and 1130) as well as pipe 2 and sub-pipe 3.3 (1220 and 1260)), sub-graph 1320 contains section 2, 4 and 5 (1120, 1140, and 1150) as well as pipe 1 and sub-pipes 3.0 to 3.2 (1210, 1230, 1240, and 1250), and sub-graph 1330 contains sections 6 and 7 (1160 and 1170) as well as pipes 4 to 6 (1270, 1280, and 1290).

The operations performed when executing a neural network can be broken down into a sequence of operations forming a directed graph in the form described in respect of FIG. 1a. Examples herein provide more flexibility in execution of a directed graph of operations such as that shown in FIG. 1a, and for example allow more complex operations to be executed efficiently.

Convolution Operations

When executing progressions of operations, for example structured in a directed graph, each section could represent a different operation. It is not necessary for each operation to be of the same type or nature. This is particularly the case where the graph of operations is used to represent the processing of a neural network. The machine learning software ecosystem allows for a diverse structure of neural networks that are applicable to many different problem spaces, and as such there is a very large possible set of operators from which a neural network can be composed.

It is desirable to define a set of pre-determined low-level operations from which a broad range of possible higher-level operations that correspond with various machine learning tool sets can be built. One example of such a low-level set of operations, is the Tensor Operator Set Architecture (TOSA). The Tensor Operator Set Architecture (TOSA) provides a set of whole-tensor operations commonly employed by Deep Neural Networks. The intent is to enable a variety of implementations running on a diverse range of processors, with the results at the TOSA level consistent across those implementations. Applications or frameworks which target TOSA can therefore be deployed on a wide range of different processors, including single-instruction multiple-data (SIMD) CPUs, graphics processing units (GPUs) and custom hardware such as neural processing units/tensor processing units (NPUs/TPUs), with defined accuracy and compatibility constraints. Most operators from the common ML frameworks (TensorFlow, PyTorch, etc.) should be expressible in TOSA.

Many of the operations in a defined operation set (such as TOSA) can be represented as a loop of scalar operations. For example, consider a 2D convolution operation which can be expressed as a multi-dimensional loop of scalar operations. These may need to be executed on 2D input data having dimensions input X (IX) and input Y (IY):

- (input) Input channel (IC)—a dimension representing the input channels upon which the operation is to be performed (in the example of images this may be three channels each representing one of red, green, and blue input channels)
- (input) Kernel dimension X (KX)—a first dimension X of a 2D kernel;
- (input) Kernel dimension Y (KY)—a second dimension Y of a 2D kernel;
- (output) Output X (OX)—a first dimension of the output feature map for the convolution operation;
- (output) Output Y (OY)—a second dimension of the output feature map for the convolution operation;
- (output) Batch (N)—a batch dimension of the operation, where the operation is to be batched;
- (output) Output channel (OC)—a dimension representing the output channels to be produced for the 2D convolution operation.

In one proposed ordering, KY/KX can be considered the inner-most dimensions and OC is the outer-most dimension.

For the 2D convolution operation example above, it is possible to express the operation to be performed as a "nested for-loop" of scalar operations as is illustrated in the pseudo-code set out below. In practice, when executing this operation, it is necessary for a processor to execute the operation across each of these dimensions by performing a multiple-accumulate operation (MAC), the result of which is then written into an accumulator (e.g. an accumulator buffer in hardware). Having operated through all of these dimensions, the 2D convolution is completed and the contents of the accumulator therefore represents the result of the 2D convolution operation across the entire dimensionality of operation.

```
for(output channel)
    for(batch N)
        for(output Y)
            for(output X)
                for(input channel)
                    for(kernel Y)
                        for(kernel X)
                            MAC
                            write accumulator
```

In examples herein, an operation (which may be a production operation or a consumption operation) may be a completed loop over a dimension of a nested for-loop. Completing a loop of a nested for-loop for example involves executing a plurality of instances of the loop (each of which may be considered a sub-operation of the operation) to generate a block of data values, in dependence on previous blocks generated in previous instances of the loop. In the example of the 2D convolution operation above, data generated at a respective instance of the loop (by a multiplication) is accumulated with data from at least one previous instance of the loop. The data generated upon completion of a loop may be a final block of data values as referred to in examples herein, and the data generated upon completion of an instance of a loop prior to the final instance may be an intermediate block of data values as referred to in examples herein.

Operations such as the 2D convolution operation described above can be separated into operation blocks, each operation block representing a subset of an operation in which each dimension of the operation block covers a subset of the full range of the corresponding dimension in the operation. For example, the 2D convolution described above can be separated into multiple operation blocks by breaking up the operation in the OY, OX, and IC dimensions. In such cases, an operation may be a completed loop of a nested for-loop over the subset of the dimensions of the operation block, and a sub-operation may be an instance of the loop. In these cases, execution of the operation may generate a plurality of final blocks of data values, each corresponding to a different subset of the dimensions.

Hardware Implementation

As described above, a data structure in the form of a directed graph may comprise plural sequenced operations that are connected to one another for execution in a progression. Described below is an example hardware arrangement for executing linked operations for at least a portion of a directed graph as illustrated in FIG. 1a.

Figure 1B:
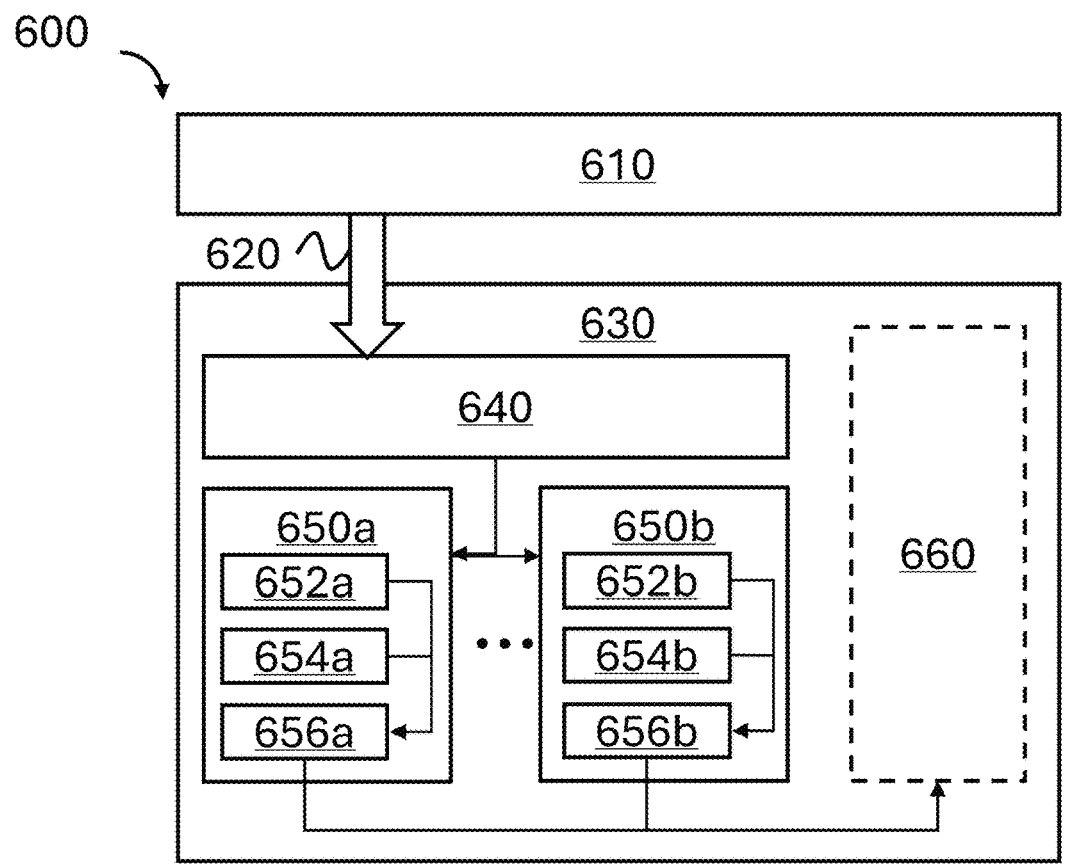
FIG. 1b is a schematic diagram of an example data processing system.

FIG. 1b shows schematically an example of a data processing system 600 including a processor 630 which may act as a co-processor or hardware accelerator unit for a host processing unit 610. It will be appreciated that the types of hardware accelerator which the processor 630 may provide dedicated circuitry for is not limited to that of Neural Processing Units (NPUs) or Graphics Processing Units (GPUs) but may be dedicated circuitry for any type of hardware accelerator. GPUs may be well-suited for performing certain types of arithmetic operations such as neural processing operations, as these operations are generally similar to the arithmetic operations that may be required when performing graphics processing work (but on different data formats or structures). Furthermore, GPUs typically support high levels of concurrent processing (e.g. supporting large numbers of execution threads), and are optimized for data-plane (rather than control plane) processing, all of which means that GPUs may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable to utilize some of the GPU's existing resources (e.g. such that at least some functional units and resources of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor means that the machine learning processing circuit may then be operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 1b, the processor 630 is arranged to receive task data 620 from a host processor 610, such as a central processing unit (CPU). The task data comprises at least one command in a given sequence, each command to be executed, and each command may be decomposed into a number of tasks, such as tasks discussed in this disclosure. These tasks may be self-contained operations, such as a given machine learning operation or a graphics processing operation. It will be appreciated that there may be other types of tasks depending on the command.

The task data 620 is sent by the host processor 610 and is received by a command processing unit 640 which is arranged to schedule the commands within the task data 620 in accordance with their sequence. The command processing unit 640 is arranged to schedule the commands and decompose each command in the task data 620 into at least one task. Once the command processing unit 640 has scheduled the commands in the task data 620, and generated a plurality of tasks for the commands, the command processing unit 640 issues each of the plurality of tasks to at least one compute unit 650a, 650b each of which are configured to process at least one of the plurality of tasks.

The processor 630 comprises a plurality of compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least a first processing module 652a, 652b for executing tasks of a first task type, and a second processing module 654a, 654b for executing tasks of a second task type, different from the first task type. In some examples, the first processing module 652a, 652b may be a processing module for processing neural processing operations, such as those which would normally be undertaken by a separate NPU. In these cases, the first processing module 652a, 652b is for example a neural engine. Similarly, the second processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader tasks, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652a, 652b of a given compute unit 650a, 650b, and tasks of a second task type to the second processing module 654a, 354b of a given compute unit 650a, 650b. The command processing unit 640 would issue machine learning/neural processing tasks to the first processing module 652a, 652b of a given compute unit 650a, 650b where the first processing module 652a, 652b is optimized to process neural network processing tasks, for example by comprising an efficient means of handling a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks. In some examples, the first and second tasks may both be neural processing tasks issued to a first processing module 652a, 652b, which is a neural engine. Such a neural processing task may involve the processing of a tensor, e.g. representing a feature map, with weights associated with a layer of a neural network.

In addition to comprising a first processing module 652a, 652b and a second processing module 654a, 654b, each compute unit 650a, 650b also comprises a memory in the form of a local cache 656a, 656b for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples, it may be necessary to provide access to data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the task data 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher-level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM® Advanced Microcontroller Bus Architecture (AMBAR) interface, such as the Advanced extensible Interface (AXI), may be used.

Figure 2:
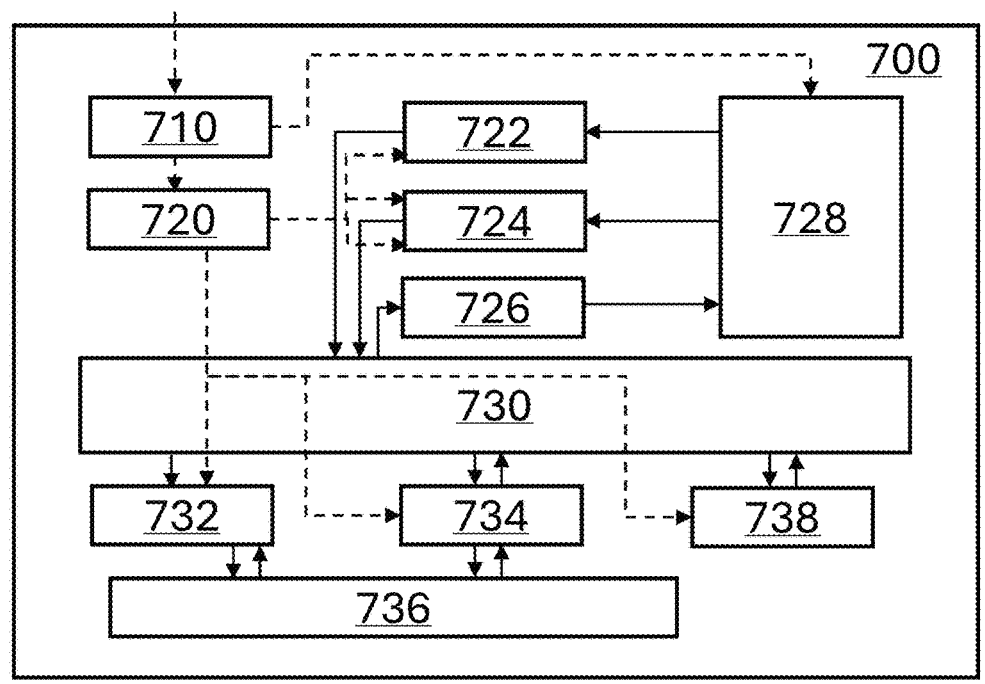
FIG. 2 is a schematic diagram of an example neural engine.

FIG. 2 is a schematic diagram of a neural engine 700, which in this example is used as a first processing module 652a, 652b in a data processing system 600 in accordance with FIG. 1b. The neural engine 700 includes a command and control module 710. The command and control module 710 receives tasks from the command processing unit 640 (shown in FIG. 1b), and also acts as an interface to storage external to the neural engine 700 (such as a local cache 656a, 656b and/or a L2 cache 660) which is arranged to store data to be processed by the neural engine 700 such as data representing a tensor, or data representing a stripe of a tensor. In the context of the present disclosure, a stripe is a subset of a tensor in which each dimension of the stripe covers a subset of the full range of the corresponding dimension in the tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor which is to be operated upon in accordance with a sequence of operations according to at least a portion (e.g. a sub-graph) of the directed graph representation of the neural network. The tensor for example represents a feature map for processing using the neural network. A neural network typically includes a sequence of layers of processing, with an output from each layer being used as an input to the next layer. Each layer for example processes an input feature map by operating upon the input feature map to generate an output feature map, which is used as the input feature map for the next layer. The term "feature map" is used generically herein to refer to either an input feature map or an output feature map. The processing performed by a given layer may be taken to correspond to an operation.

In this example, the handling unit 720 splits data representing a stripe of a feature map into a plurality of blocks of data, each of which represents a respective part of the feature map. The handling unit 720 also obtains, from storage external to the neural engine 700 such as the L2 cache 660, task data defining operations selected from an operation set comprising a plurality of operations. In this example, the operations are structured as a progression of operations representing a sequence of layers of the neural network. A block of data is allocated as an input to one of the operations by the handling unit 720.

The handling unit 720 coordinates the interaction of internal components of the neural engine 700, which include a weight fetch unit 722, an input reader 724, an output writer 726, a direct memory access (DMA) unit 728, a dot product unit (DPU) array 732, a vector engine 734, a transform unit 738, an accumulator buffer 736, and a shared storage 730, for processing of blocks of data. The data dependencies across the functional units are tracked by the handling unit 720. Processing is initiated by the handling unit 720 in a functional unit if all input blocks are available and space is available in the shared storage 730 of the neural engine 700. The shared storage 730 may be considered to be a shared buffer, in that various functional units of the neural engine 700 share access to the shared storage 730.

In the context of a directed graph representing the operations to be performed, each of the internal components that operates upon data can be considered to be one of two types of component. The first type of component is an execution unit (and is identified within the neural engine 700 as such) that maps to a section that performs a specific instance of an operation within the directed graph. For example, the weight fetch unit 722, input reader 724, output writer 726, dot product unit array 732, vector engine 734, transform unit 738 each are configured to perform one or more predetermined and fixed operations upon data that it receives. Each of these sections can be uniquely identified with an identifier and each execution unit can also be uniquely identified.

Similarly, all physical storage elements within the neural engine (and in some instances portions of those physical storage elements) can be considered to be uniquely identified within the neural engine. The handling unit 720 is configured to allocate storage elements to respective connections in the directed graph, which can correspond to pipes as explained above. For example, portions of the accumulator buffer 736 and/or portions of the shared storage 730 can each be regarded as a storage element that can act to store data for a pipe or a sub-pipe within the directed graph, as allocated by the handling unit 720. A pipe or a sub-pipe can act as a connection between sections (as executed by execution units) to enable a sequence of operations as defined in the directed graph to be linked together within the neural engine 700. Put another way, the logical dataflow of the directed graph can be mapped to the physical arrangement of execution units and storage elements within the neural engine 700. Under the control of the handling unit 720, execution can be scheduled on the execution units and data can be passed between the execution units via the storage elements in accordance with the mapping, such that the linked operations of a graph can be executed without needing to write data memory external to the neural engine 700 between executions. The handling unit 720 is configured to control and dispatch work representing performing an operation of the graph on at least a portion of the data provided by a pipe or a sub-pipe.

The weight fetch unit 722 fetches weights associated with the neural network from external storage and stores the weights in the shared storage 730. The input reader 724 reads data to be processed by the neural engine 700 from external storage, such as a block of data representing part of a tensor. The output writer 726 writes data obtained after processing by the neural engine 700 to external storage. The weight fetch unit 722, input reader 724 and output writer 726 interface with the external storage (which is for example the local cache 656a, 656b, which may be a L1 cache such as a load/store cache) via the DMA unit 728.

Data is processed by the DPU array 732, vector engine 734 and transform unit 738 to generate output data corresponding to an operation in the directed graph. The result of each operation is stored in a specific pipe or sub-pipe within the neural engine 700. The DPU array 732 is arranged to perform one or more operations associated with a dot product operation between two operands, such as between an array of weights and a corresponding block of data (e.g. representing part of a tensor). The vector engine 734 is arranged to perform elementwise operations, for example to apply scale parameters to scale an output of a dot product calculated by the DPU array 732. Data generated during the course of the processing performed by the DPU array 732 and the vector engine 734 may be transmitted for temporary storage in the accumulator buffer 736 from where it may be retrieved by either the DPU array 732 or the vector engine 734 (or another different execution unit) for further processing as desired.

The transform unit 738 is arranged to perform in-block transforms such as dimension broadcasts or axis swaps. The transform unit 738 obtains data (e.g. after processing by the DPU array 732 and/or vector engine 734) from a pipe or a sub-pipe, for example mapped to at least a portion of the shared storage 730 by the handling unit 720. The transform unit 738 writes transformed data back to the shared storage 730.

To make efficient use of the shared storage 730 available within the neural engine 700, the handling unit 720 determines an available portion of the shared storage 730, which is available during execution of part of a first task (e.g. during processing of a block of data associated with the first task by the DPU array 732, vector engine 734 and/or transform unit 738). The handling unit 720 determines a mapping between at least one logical address associated with data generated during execution of a second task (e.g. by processing of a block of data associated with the second task by the DPU array 732, vector engine 734 and/or transform unit 738) and at least one physical address of the shared storage 730 corresponding to the available portion. The logical address is for example a global address in a global coordinate system. Hence, by altering the physical address corresponding to a given logical address, the handling unit 720 can effectively control usage of the shared storage 730 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein.

In an analogous manner, the handling unit 720 can determine a mapping between logical storage locations (e.g. corresponding to respective logical addresses) corresponding to respective connections within the directed graph and sets of storage elements (e.g. corresponding to sets of physical addresses within storage of the neural engine 700, such as within the accumulator buffer 736 and/or the shared storage 730). In this way, the handling unit 720 can for example dynamically allocate first and second sets of storage elements to correspond to first and second logical storage locations associated with first and second operations (e.g. first and second sections) of the directed graph.

The handling unit 720 can for example allocate respective physical storage locations (e.g. corresponding to respective storage elements of the storage of the neural engine 700, such as respective buffers of the accumulator buffer 736 and/or the shared storage 730) for storing respective blocks generated by an operation of the directed graph, such as by a production operation. For example, the handling unit 720 can allocate a physical storage location for storing an intermediate block of intermediate data values generate by the production operation in determining a final block of final data values based on the intermediate block. In allocating the physical storage locations, the handling unit 720 may map logical storage locations (e.g. corresponding to respective logical addresses) corresponding to respective connections within the directed graph to respective sets of storage elements. The mapping may be performed dynamically by the handling unit 720, to utilize the storage of the neural engine 700 more efficiently.

It will be appreciated that in a graph of operations there does not need to be only a single instance of a particular type of operation. For example, multiple instances of a convolution operation could be present in a graph of operations. In the above example hardware arrangement only a single convolution engine may be present. Therefore, it will be appreciated that there does not need to be a direct 1:1 mapping between operations in the graph (sections) and execution units, and similarly no direct 1:1 mapping between pipes and storage elements and/or between sub-pipes and storage elements. In particular, a single execution unit may be configured at different instances in time to execute different instances of a convolution operation (e.g. first and second sections). Similarly, the input reader may be required to read data as part of different sections in the graph. The same can be said for storage elements and pipes and/or sub-pipes.

All storage in the neural engine 700 may be mapped to corresponding pipes and/or sub-pipes, including look-up tables, accumulators, etc., as discussed further below. The width and height of pipes and/or sub-pipes can be programmable, resulting a highly configurable mapping between pipes, sub-pipes and storage elements within the neural engine 700.

Ordering of execution of the sections is implied by dependencies on inputs. A memory load operation has no data dependencies (unless it is a gather operation), so is implicitly early in the graph. The consumer of the pipe (or sub-pipe) that the memory read produces is implicitly after the memory read. A memory store operation is near the end of the graph, as it produces no pipes or sub-pipes for other operations to consume. The sequence of execution of a progression of operations is therefore handled by the handling unit 720 as will be explained in more detail later.

Figure 3:
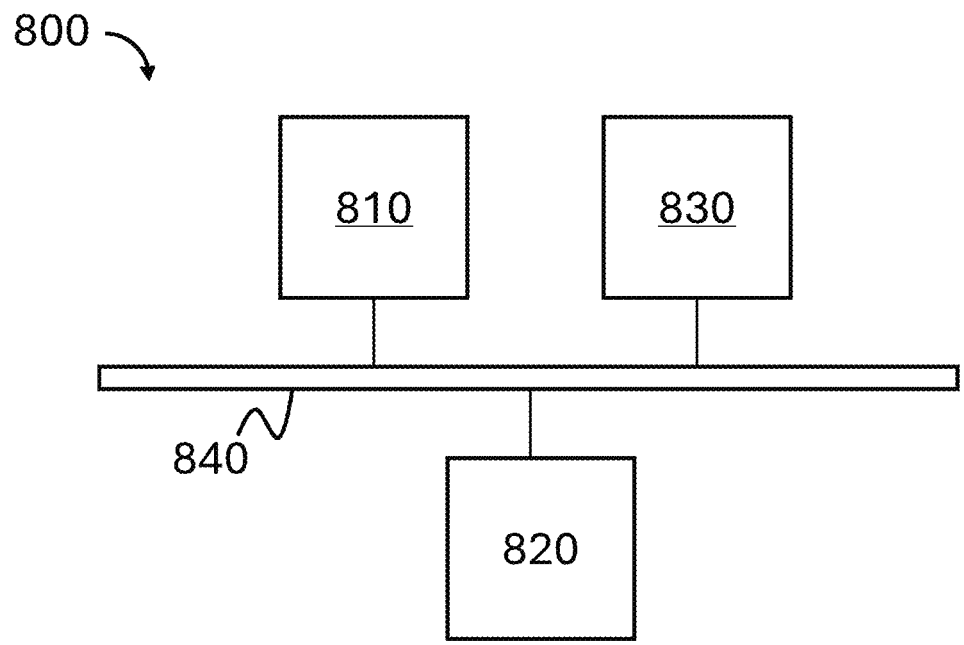
FIG. 3 is a schematic diagram of an example system for allocating handling data.

FIG. 3 shows schematically a system 800 for allocating handling data, and in some examples generating a plurality of blocks of input data for processing.

The system 800 comprises host processor 810 such as a central processing unit, or any other type of general processing unit. The host processor 810 issues task data comprising a plurality of commands, each having a plurality of tasks associated therewith.

The system 800 also comprises a processor 830, which may be similar to or the same as the processor 630 of FIG. 1b and may comprise at least some of the components described of and/or be configured to perform the methods described above. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBAR) interface, such as the Advanced extensible Interface (AXI), may be used.

Neural Engine Program Descriptor (NED)

As explained above, the neural engine 700 receives tasks from the command processing unit 640 to execute operations from the directed graph. The neural engine 700 is configured to execute operations selected from a base set of operations defining an operator set. One example of such an operator set is the Tensor Operator Set Architecture (TOSA) base inference profile, which defines a set of operations that can collectively be used to define the operations of a wide range of neural network operations. One exception to the TOSA operator set is control flow operations that may be implemented by way of task data processed by the command processing unit 640. It will be appreciated that there may be multiple neural engines with the processor 630 and thus multiple tasks can be issued concurrently to different neural engines.

In an example implementation, a task issued by the command processing unit 640 for execution by the neural engine 700 is described by task data which in this example is embodied by a neural engine program descriptor (NED), which is a data structure stored in memory and retrieved by the neural engine when executing the task issued by the command processing unit. The NED describes at least a portion of a complete graph of operations (sections) to be performed when executing the graph of operations (e.g. representing a neural network). As discussed above, sections are mapped to various hardware execution units within the neural engine 700 and essentially represent instantiations of a particular operator at a position within the graph. In one example, these sections are described by specific 'elements' that collectively define the operations forming part of the NED. Furthermore, the NED has an unordered list of pipes and/or sub-pipes (graph vertices) and an unordered list of sections/operations (graph nodes). Each operation specifies its input and output giving rise to adjacency of operation in the directed graph to which a particular operation is connected. An example NED comprises a NED structure comprising a header, the elements each corresponding to a section in the graph. The NED describes the various requirements of ordering, number and relationship of these sections and pipes and/or sub-pipes. In one implementation, each of the execution units and each storage element (or portion of a storage element) of the neural engine 700 has a sub-descriptor definition which defines how that execution unit/storage element can be configured for use in implementing a specific section, pipe or sub-pipe in the graph. An example of the hardware units and their corresponding elements is set out below:

Weight Fetch (WF): NEDWeightFetchElement
Input Reader (IR): NEDInputReaderElement
Output Writer (OW): NEDOutputWriterElement
Convolution Engine (CE): NEDConvolutionEngineElement
Transform Unit (TU): NEDTransformUnitElement
Vector Engine (VE): NEDVectorEngineElement The NED therefore may specify the execution unit or in other words specify a compatible execution unit for each operation. In embodiments there may be more than one execution unit of a given type such as InputReader may have two command queues which can operate concurrently. A NED may specify which of the queues is assigned so that there remains a 1:1 relationship between what the NED specifies and the physical hardware to which it points.

The dataflow and dependencies of the task's graph is described by pipes and/or sub-pipes. Pipes and/or sub-pipes are used to represent data storage elements within the neural engine 700 and describe the relationship between sections (operations) in a producer-consumer relationship: the output destination pipe or sub-pipe (e.g. a pipe or sub-pipe number) and each input source pipe or sub-pipe (e.g. a pipe or sub-pipe number) for every section is defined in the NED elements of the NED. Pipes and sub-pipes each have only a single producer but may have multiple consumers. A pipe and/or a sub-pipe may be mapped to one of several different physical storage locations (e.g. storage units in the neural engine 700), but not all physical storage locations may be suitable for the different section operations. It will be appreciated that, in some arrangements, a pipe may be mapped to only a portion of a storage unit, which may include at least one storage element. For example, a physical buffer (or a set of physical buffers, which may be or form part of a memory bank) may be considered to be a storage unit, and a physical address (or a set of physical addresses) corresponding to or within a physical buffer may be considered to be a storage element. For example, a storage unit may correspond to a set of physical buffers and a storage element may be a physical buffer of the set of physical buffers, the physical buffer comprising a set of physical addresses. In such cases, a pipe and/or a sub-pipe can describe double-buffering (for example) behavior between its producer and consumers. The output data generated by a section and stored in a pipe or a sub-pipe is referred to equivalently as both a block (of data) and a (virtual) buffer, with a block of data occupying one physical buffer location. Irrespective of location, pipes and/or sub-pipes may be non-coherent with a wider memory system associated with the neural engine 700 and with processor 630, and data is stored out using the Output Writer element of the neural engine 700.

In some arrangements the NED may be configured such that the same pipe is used for multiple inputs, where any relevant usage constraints (such as format or location) are satisfied. For example, an element-wise multiply might have the same pipe for the two input operands in order to square the input. In examples, though, the NED may be configured such that each sub-pipe has a single producer.

In some embodiments, sections such as InputReader and WeightFetcher have no input pipes and/or sub-pipes and instead their data comes from external memory, such as an external cache or DRAM. By contrast, some sections, such as OutputWriter have no output pipes or sub-pipes. In this case, their data is written to external memory.

For a section to run, it must have all the appropriate buffers available for its input source pipes and/or sub-pipes. A section may produce a new buffer in its output destination pipe or sub-pipe and so there must be space available in the pipe or sub-pipe for this new buffer. The neural engine 700 is responsible for tracking all of these dependencies as discussed further below with reference to FIGS. 4 to 10.

The NED also contains information that describes any divergent or convergent branches between sections and pipes/sub-pipes. For example the NED identifies, for each pipe and sub-pipe in the graph, the number of producers and consumers associated with respective pipes and sub-pipes. The NED may also comprise pointers to each of the sub-descriptor elements to enable the specific configuration of each element to be read by the handling unit 720.

Storage Allocation

Figure 4:
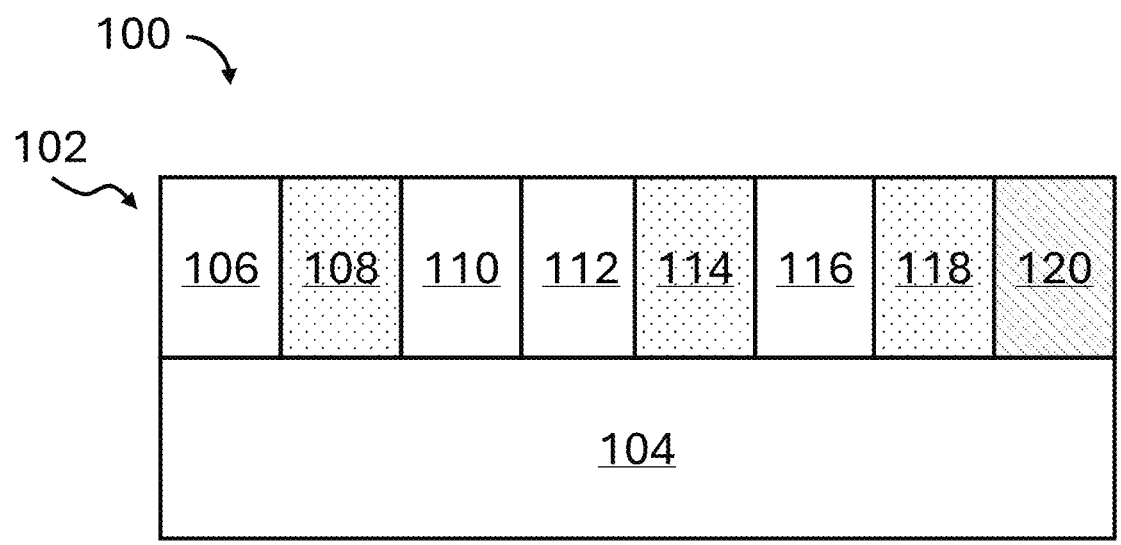
FIG. 4 is a schematic diagram of example storage.

Allocation of respective storage elements to different sub-pipes by the handling unit 720, for example in a dynamic manner, will now be described in more detail, with reference to FIG. 4. FIG. 4 illustrates schematically storage 100 comprising two storage units 102, 104 each corresponding to a respective set of buffers, according to a simplified example. Each storage unit 102, 104 comprises eight buffers, each corresponding to a different respective storage element. Each of the storage elements corresponds to a different respective physical location within the storage unit 102, 104. The eight storage elements are labelled with reference numerals 106-120 for the first storage unit 102 and omitted for the second storage unit 104, for clarity. The storage 100 of FIG. 4 may be used as storage of or accessible to the neural engine 700 of FIG. 2, such as the accumulator buffer 736 or the shared storage 730 (which may be referred to herein as a shared buffer). It is to be appreciated that the example of FIG. 4 is merely illustrative and in other cases a storage may include more or fewer storage units than two, a storage unit may be a different physical area of a storage than a set of buffers, a storage element may be a different component of a storage unit than a buffer and/or a storage unit may include more or fewer storage elements than eight.

In an example in which the storage 100 is used as the accumulator buffer 736, the storage 100 may be a high bandwidth SRAM static random access memory, which may be used to pass data between the convolution engine and the vector engine. The storage 100 may be partitioned such that portions of the convolution engine selectively communicate with specific banks of the storage 100, respectively. This may reduce data routing and simplify the physical structure of the storage 100. The accumulator buffer 736 in this example is smaller than the shared storage 730 and therefore consumes less power per access than the shared storage 730. In a particular example, the accumulator buffer 736 comprises two buffers of 16K 32-bit accumulators each, such as two of the buffers 106-120 shown in the illustrative example of FIG. 4.

In examples, a directed graph represented by task data may include a plurality of convolution engine sections in a chain. To accommodate this, the accumulator buffer 736 could be increased relative to a size for accommodating a single convolution engine section. However, this would increase the physical area of the hardware occupied by the accumulator buffer 736 and increase the power consumption for accessing data within the accumulator buffer 736. Hence, in examples herein, different sets of storage elements of a given storage unit (the first storage unit 102 in FIG. 4) are dynamically allocated to correspond to different logical storage locations, corresponding to different sub-pipes, for storing respective outputs of different operations, corresponding to different sections. This allows multiple sections to write to the same physical storage (in this case, to the same storage unit 102). Each sub-pipe (corresponding to a respective set of storage elements) in these examples has a single producer and at least one consumer (where the producer and at least one consumer are respective sections of the directed graph). Sub-pipes may thus be used to pass data between respective sections, but with a plurality of sections sharing the same underlying physical storage unit 102.

The first storage unit 102 in this case, comprising the storage elements 106-120 which are dynamically allocated to different sub-pipes, may be considered to correspond to a multi-pipe. In examples, a multi-pipe is mapped by the handling unit 720 to a unique physical storage location, which in this case is a unique storage unit 102. The physical storage location of a given multi-pipe does not overlap with the physical storage location of other multi-pipes (such as any other multi-pipe). However, a plurality of sub-pipes can be mapped to the same multi-pipe by the handling unit 720. The handling unit 720 can manage the mapping of the plurality of sub-pipes to the same physical storage location (the first storage unit 102 of FIG. 4), by managing the status of each of the sub-pipes in a given multi-pipe to avoid data being incorrectly overwritten and so forth.

To simplify execution of the task, various properties of sub-pipes may be the same for all sub-pipes of a given multi-pipe, such as a number of storage elements (and/or storage units) for a given sub-pipe, a storage unit and/or storage comprising the storage elements (such as whether the storage elements are within the accumulation buffer 736 or the shared storage 730), a start memory bank at which a given storage unit associated with the multi-pipe starts, a number of memory banks for the given storage unit, a start memory word for the given storage unit, a number of memory words for the given storage unit, and so on. However, at least one property may differ between sub-pipes of a multi-pipe, such as data specific parameters, e.g. the data values to be written to a given sub-pipe, a format of the data values, whether the data values are signed values and so forth.

The mapping of a plurality of sub-pipes to the same multi-pipe may be indicated by the task data. For example, the task data may indicate that first and second logical storage locations (associated with first and second operations of the directed graph) are each associated with a logical storage area. The handling unit 720 can then allocate a particular physical region of the storage 100, such as the first storage unit 102, to correspond to the logical storage area, based on the task data.

In FIG. 4, the storage elements are dynamically allocated to different sub-pipes, each corresponding to a different respective set of storage elements. Dynamically allocating the storage elements in this way may mean that consecutive storage elements of a given set are not located contiguously with each other within the storage 100. Storage elements of a first set may thus be interleaved with storage elements of a second set and vice versa. For example, at least one storage element of the second set may be disposed between a first storage element of the first set and a second storage element of the first set within the storage unit, such as the first storage unit 102 of FIG. 4. FIG. 4 shows such an example.

In FIG. 4, the first, third, fourth and sixth storage elements 106, 110, 112, 116 are successively allocated to a first set (shown without shading in FIG. 4). The second, fifth and seventh storage elements 108, 114, 118 are allocated to a second set (shown with dotted shading in FIG. 4). The eighth storage element 120 is unallocated and is shown with diagonal shading in FIG. 4. FIG. 4 therefore illustrates an example of non-contiguous first and second sets, with the second storage element 108 (of the second set) interleaved between the first and third storage elements 106, 110 (of the first set), and the sixth storage element 116 (of the first set) interleaved between the fifth and seventh storage elements 114, 118 (of the second set).

As at least one of the first and second sets of storage elements for storing the first and second outputs, respectively, may include non-contiguous storage elements within the storage 100, it may not be sufficient to merely track the head and tail of the first and second sets in order to determine which storage elements are allocated to the first and second sets respectively.

Hence, in examples herein, the handling unit 720 is configured to track usage of the storage elements 106-120 during execution of the task, for example to track which storage elements are allocated to which sub-pipe, and in which order. The tracking of usage of the storage elements by the handling unit 720 allows the location of a given piece of data to be readily identified. This allows the data stored in a given physical storage location (which may be referred to as prior data, generated in a prior sub-operation of an operation) to be updated with subsequently generated data (which may be referred to as output data, generated in a sub-operation of the operation, which is executed after the prior sub-operation, such as consecutively after). In this way, the output data can be used to update the prior data stored in the physical storage location. For example, the prior data may be accumulated with the output data. This may be referred to as a destination loopback, involving a loopback over a destination pipe or sub-pipe. In this way, the execution circuitry can write to the destination pipe or sub-pipe, then return back to the start of that destination pipe or sub-pipe, and accumulate additional data into the output previously stored therein.

Destination Loopback

Figure 5:
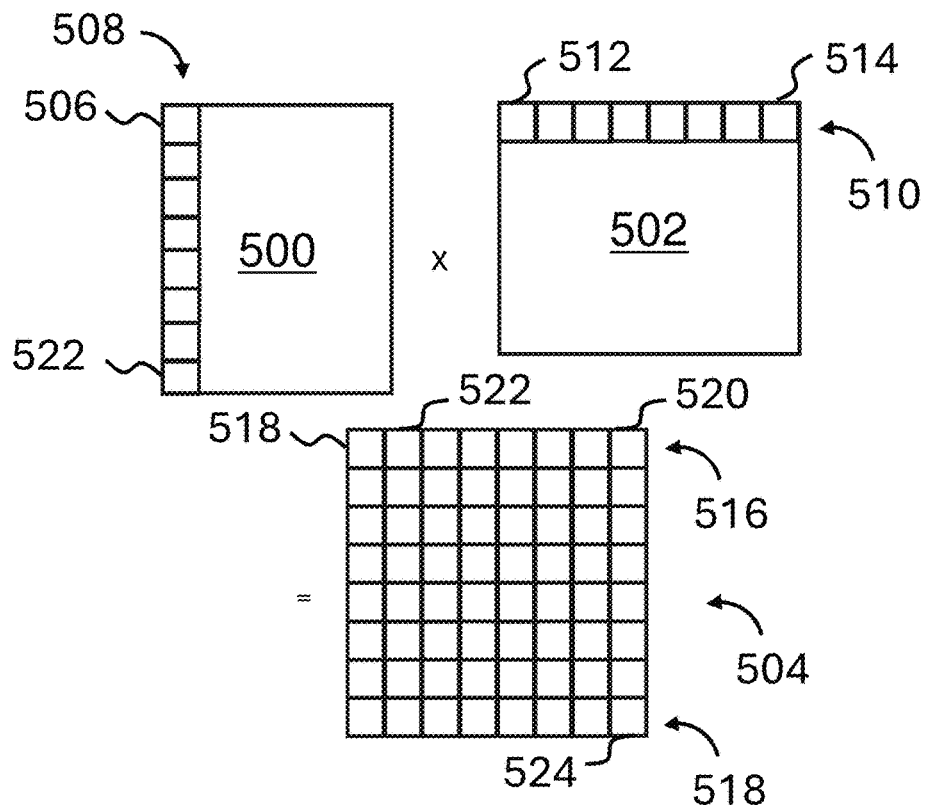
FIG. 5 is a schematic diagram of a first sub-operation of a matrix multiplication.

FIG. 5 illustrates schematically a first sub-operation of a matrix multiplication, which is an example of an operation that may be represented by task data. The operation for example comprises a plurality of sub-operations, each corresponding to a respective loop over a dimension of a multi-dimensional nested loop (such as the nested for-loop discussed above). The first sub-operation of FIG. 5 may be taken to correspond to a prior sub-operation of the operation as referred to in examples herein, and for example representatives a first loop over a given dimension of the nested loop.

The first sub-operation of FIG. 5 is a first outer product between a first tensor 500 and a second tensor 502 to produce a first output tensor 504, which may be represented by first output data. The first outer product may be considered to be a tensor outer product as it is an outer product of two tensor. The first outer product involves multiplying a first block 506 of a first column 508 of the first tensor 500 with each block of a first row 510 of the second tensor 502, in turn, from a first block 512 of the first row 510 of the second tensor 502 to a final block 514 of the first row 510 of the second tensor 502, to generate a first row 516 of output blocks. The result of multiplying the first block 506 of the first tensor 500 with each respective block of the first row 510 of the second tensor 502 is stored in corresponding blocks of the first row 516 of output blocks, i.e. so that the result of multiplying the first block 506 of the first tensor 500 with the first block 512 of the first row 510 is stored in a first block 518 of the first output tensor 504 and the result of multiplying the first block 506 of the first tensor 500 with the final block 514 of the first row 510 is stored in a final block 520 of the first output tensor 504.

In calculating the first outer product, each block of the first column 508 of the first tensor 500 is multiplied by each block of the first row 510 of the second tensor 502, from the first block 506 of the first column 508 to a final block 522 of the first column 508, to generate respective rows of the first output tensor 504 from the first row 516 to a final row 518. Hence, the first row 510 is re-used for each block of the first tensor 500. In this way, a given block of the first column 508 is multiplied with each block of the first row 510 to generate respective blocks of a corresponding row of output blocks of the first output tensor 504. This process is repeated for each of the blocks of the first column 508 to generate, for each block of the first column 508, a respective row of output blocks of the first output tensor 504. It is to be appreciated that only a subset of blocks of the first tensor 500, second tensor 502 and first output tensor 504 are labelled in FIG. 5, for clarity.

The first output tensor 504 generated by the first outer product represents an intermediate result of an operation corresponding to a multiplication of the first tensor 500 with the second tensor 502. A final output tensor is generated by an accumulation of a plurality of respective output tensors, as explained further with reference to FIG. 6.

In the case of FIG. 5, each of the blocks of the first output tensor 504 are written to corresponding storage elements of storage. The handling unit 720 allocates appropriate storage elements for storing each respective block, for example based on usage of the storage as tracked by the handling unit 720. For example, the handling unit 720 may track the usage to identify which storage elements are available for allocation to a respective sub-pipe for storing the output tensor 504, and to identify which storage elements are to be allocated to store each respective block of the output tensor 504. As can be seen from FIG. 4, the storage elements of a given sub-pipe need not be contiguous within the storage 100. Hence, the handling unit 720 may allocate non-contiguous storage elements to store consecutive blocks of the first output tensor 504.

In examples, the handling unit 720 allocates a plurality of storage elements of a physical storage location of the storage to correspond to a logical storage location for storing an output of the operation, such as the output tensor. In this case, the physical storage location is also used to store intermediate outputs of the operation, such as the first output tensor 504 of FIG. 5, which are accumulated with data store therein to iteratively calculate the output tensor. The handling unit 720 generates execution instructions for executing the first sub-operation (which may be referred to as prior execution instructions) for generating the first output tensor 504. The execution instructions comprise location data indicative of a location of a given storage element within the physical storage location, for use in determining an initial storage element within the physical storage location from which writing of the blocks of the first output tensor 504 (which may be referred to as prior data) is to start. The location data may represent the location of the initial storage element or may represent a location of another storage element from which the location of the initial storage element can be determined.

For example, if the handling unit 720 allocates the first sub-pipe to store the output tensor (and hence the first output tensor 504), which corresponds to the first set of storage elements in FIG. 4, the handling unit 720 may allocate the first storage element 106 as the storage element from which writing of the first output tensor 504 is to begin. In other words, the handling unit 720 may instruct the execution circuitry to write the first block 518 of the first output tensor 504 to the first storage element 106. The location data provided to the execution circuitry may represent the location of the first storage element 106, e.g. by indicating a physical address of the first storage element 106 within the first storage unit 102. For example, the location data may be a pointer to the physical address of the first storage element 106. In other examples, though, the location data may represent the location of a different storage element, e.g. with a predefined offset from the first storage element 106, such as the second storage element 108, from which the location of the first storage element 106 can be determined by the execution circuitry in executing the first sub-operation.

Figure 6:
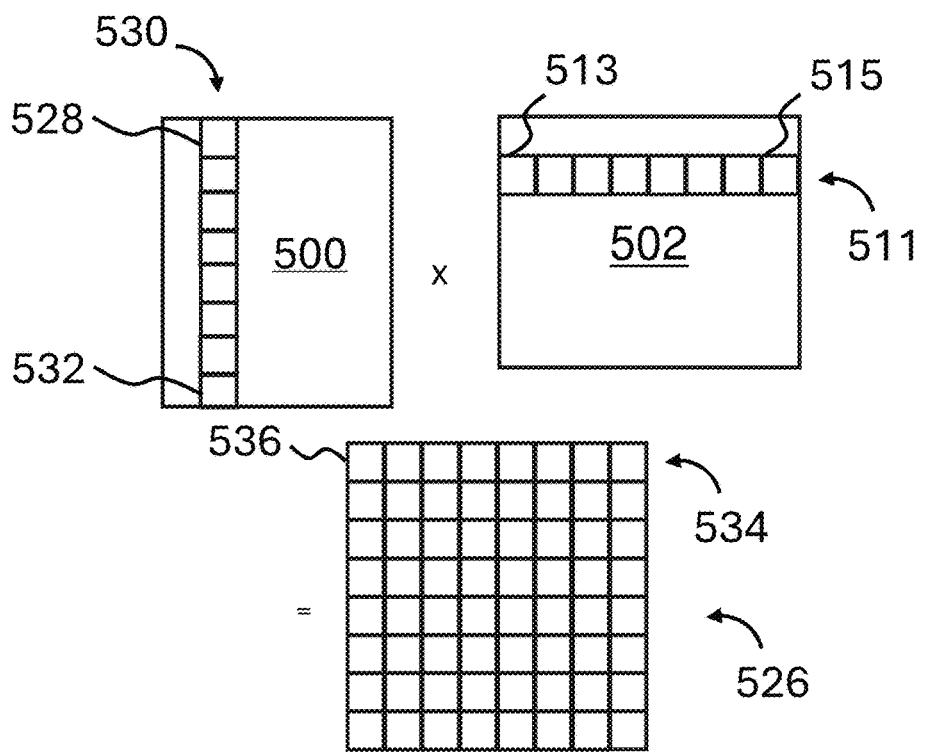
FIG. 6 is a schematic diagram of a second sub-operation of a matrix multiplication.

It is to be appreciated that the first storage unit 102 of FIG. 4 comprises fewer storage elements than there are blocks in the first output tensor 504, and the reference to various components of the storage 100 of FIG. 4 in the context of FIGS. 5 and 6 is merely to explain certain principles herein. In practice, a given storage may comprise the same number of storage elements or more storage elements than there are blocks in a given output to be stored therein (such as the first output tensor 504), so that the whole output can be stored in the storage at a given time (although this need not be the case).

In examples such as that of FIG. 5, the handling unit 720 allocates respective storage elements for storing respective blocks of a given output (such as the first output tensor 504) so that the blocks are written to the storage elements according to a predefined order, as defined by the handling unit 720. For example, the blocks may be written sequentially to the first sub-pipe, e.g. to successive storage elements of the first sub-pipe as predefined by the handling unit 720 in allocating the storage elements to the first sub-pipe.

Writing of the first output tensor 504 to the first sub-pipe by the execution circuitry may end with writing a final block 524 to a final storage element of the storage (which may be considered to correspond to writing a final portion of prior data to the final storage element). The final storage element may be different from the initial storage element (and in some cases non-contiguous with the final storage element). For example, the initial storage element may be the first storage element 106 and the final storage element may be the sixth storage element 116 in the first storage unit 102 of FIG. 4. In such cases, to accumulate an initial block of a subsequent output tensor, representing a subsequent intermediate output, to the initial block of the first output tensor 504 stored in the first storage element 106 involves looping back from the final storage element to the first storage element within the first storage unit 102, rather than continuing to write from the final storage element within the first sub-pipe.

FIG. 6 shows schematically a second sub-operation of the matrix multiplication comprising the first sub-operation of FIG. 5. The second sub-operation of FIG. 6 is performed consecutively after the first sub-operation of FIG. 5 to generate a second output tensor 526, which is representative of an accumulation of the first output tensor 504 with output data generated by the second sub-operation. The second sub-operation of FIG. 6 may be taken to correspond to a sub-operation of the operation as referred to in examples herein, and for example represents a second loop over the given dimension of the nested loop, which is performed consecutively after the first loop shown in FIG. 5. Features of FIG. 6 that are the same as corresponding features of FIG. 5 are labelled with the same reference numerals; corresponding descriptions are to be taken to apply.

The second sub-operation of FIG. 6 comprises computing a second outer product between the first tensor 500 and the second tensor 502 to produce output data, which may be referred to in the context of FIG. 6 as second output data. Generating the second outer product involves multiplying each block of a second column 530 of the first tensor 500 with each block of a second row 511 of the second tensor 502, in turn, from a first block 513 of the second row 511 of the second tensor 502 to a final block 515 of the first row 511 of the second tensor 502. In this way, multiplication of a first block 528 of the second column 530 of the first tensor 500 with each block of the second row 511 of the second tensor 502 generates a first row of output blocks of the second output data and so on, until multiplication of a final block 532 of the second column 530 of the first tensor 500 with each block of the second row 511 of the second tensor 502 generates a final row of output blocks of the second output data. However, rather than overwriting each row of output blocks of the first output tensor 504 with a corresponding row of output blocks of the second output data, each respective block of a given row of output blocks of the second output data is accumulated with a corresponding block of a corresponding row of output blocks of the first output tensor 504 to generate a corresponding row of output blocks of the second output tensor 526. For example, each block of the first row of output blocks of the second output data is accumulated with a corresponding block of the first row 510 of output blocks of the first output tensor 504 to generate a first row 534 of output blocks of the second output tensor 526. For example, the first block of the first row of output blocks of the second output data is accumulated with the first block 518 of the first row 510 of output blocks of the first output tensor 504 to generate a first block 536 of the first row 534 of output blocks of the second output tensor 526, and so on. This accumulation is performed block-by-block along a given row, from a first to a final block of a row (e.g. from the first block 518 of the first row 516 of the first output tensor 504 to the final block 520 of the first row 516 of the first output tensor 504), and then row-by-row from the first row 516 of the first output tensor 504 to the final row 518 of the output tensor 524 to generate each row of the second output tensor 526. It is to be appreciated that only a subset of blocks of the first tensor 500, second tensor 502 and second output tensor 526 are labelled in FIG. 6, for clarity.

The order in which the accumulation is to be performed may be considered to be a predefined order, which is indicated to the execution circuitry by the execution instructions generate and sent by the handling unit 720. The execution instructions instruct the execution circuitry to generate the second output data and to update the data stored in storage (representing the first output tensor 504) according to the predefined order, starting from an initial storage element, which is for example the same initial storage element described with reference to FIG. 5. The execution instructions comprise the location data indicative of a given storage element, from which the location of the initial storage element can be determined. In FIG. 6, the updating of the data in the storage comprises accumulation of each respective block of the first output tensor 504 with a corresponding block of the second output data, according to the predefined order.

With the approach of FIGS. 5 and 6, a given row of the second tensor 502 can remain in storage, to be multiplied with successive blocks of a corresponding column of the first tensor 500. FIG. 5 illustrates the first row 510 of the second tensor 502 remaining in storage, to be multiplied with successive blocks of the first column 508 of the first tensor 500 to generate the first output tensor 504, whereas FIG. 6 illustrates the second row 511 of the second tensor 502 remaining in storage, to be multiplied with successive blocks of the second column 530 of the first tensor 500 to generate the second output tensor 504. While a given row of the second tensor 502 is in storage during the generation of a corresponding output tensor, the remainder of the second tensor 502, such as remaining rows of the second tensor 502 (and in some cases the entirety of the second tensor 502) may be stored in further storage, which is more power intensive to access than the storage used to store the given row of the second tensor 502. Hence, retaining the given row of the second tensor 502 in the storage in this manner can reduce memory accesses to the further storage, which can reduce power consumption and bandwidth. For example, the storage used to store the given row of the second tensor 502 may be local storage of the neural engine 700, e.g. the shared storage 730, whereas the further storage may be external storage, external to the neural engine 700, such as a local cache and/or a L2 cache of the processor 630 of FIG. 1b.

The multiplication of each block of a given column of the first tensor 500 with each block of a given row of the second tensor 502 may be repeated for each column of the first tensor 500 and its corresponding row of the second tensor 502 (i.e. so that each column of the first tensor 500 is multiplied by each corresponding row of the second tensor 502 as described with reference to FIGS. 5 and 6). In other words, in (row, column) block numbering, block (a, k) of the first tensor 500 is multiplied by block (k, b) of the second tensor to add onto block (a, b) of the output. The first outer product of FIG. 5 corresponds to k=0, the second outer product of FIG. 6 corresponds to k=1, and so on. Each multiplication of a given column of the first tensor 500 with a corresponding row of the second tensor 502 may be considered to generate respective output data (e.g. representing a respective output tensor), which is accumulated with the previous result stored in the storage elements allocated to store the final output tensor, according to the predefined order. In this way, the output data is iteratively accumulated with the previous result (which may be considered an intermediate result) until the final output tensor is generated.

In examples such as that of FIGS. 5 and 6 in which the operation comprises a plurality of sub-operations, each corresponding to a respective loop over a dimension of a multi-dimensional nested loop, the task data may indicate the dimension. The task data, which for example represents the NED, may thus specify a particular dimension that is being iterated over as a dimension that triggers a destination loopback.

As an example, a matrix multiplication may comprise iteration over three dimensions (corresponding to three nested for-loops), represented by variables b, a and k. In this example, k is specified as the dimension on which destination loopback is triggered such that each time k is incremented, the output pipe or sub-pipe is looped over again, to accumulate data generated in that iteration of the loop with data stored in the output pipe or sub-pipe (e.g. starting from the start of the output sub-pipe). This is represented by the following pseudo-code, involving destination loopback over an output pipe:

```
for (k = 0; k < K; k += 128) { // dimension 0 loop
  for (a = 0; a < 1024; a+= 128) { //dimension 1 loop
    // load the next a block, which is multiplied by all b blocks for this k
    ir_load(blk_A, A, a, k);
    for (b = 0; b< 1024; b+= 128) { // dimension 2 loop
      if (a == 0) {
        // first reduction loop loads the b blocks
        // later a loops re-use the pipe data 'b's (the row)
        // moving to next k loop loads next row k of a tensor such as second input tensor 502
        ir_load(blk_B[b/128], B, k, b);
      }
      // Calculate matrix multiplication of row a by column b, position k
      // This is a 128x128 matrix multiplication
      // b is transposed on read by the convolution engine
      // Result is written to L2 accumulator RAM (which is e.g. storage of the processor 630)
      ce_matmul_(blk_ACC, blk_A, blk_B[b/128]);
      // Add L2 accumulator to L3 accumulator in shared buffer RAM (e.g. shared storage 730)
      // If ( k = 0 ) then write out the buffer, otherwise accumulate onto it
      idx_c = (a/128)*8 + (b/128);
      ve_accum(blk_C[idx_c], blk_ACC, first_reduction_block = (k == 0));
      if (k + 128 >= K) {
        // last k reduction loop, destination loopback
        ve_mul(blk_D, blk_C[idx_c], scale);
        ow_store(blk_D, D, a, b);
      }
    }
  }
}
```

50

In this case, the k dimension represents the outermost dimension of the nested for-loop. However, in other examples, other dimensions may be selected for destination loopback, such as an innermost dimension and/or an intermediate dimension between the outermost and innermost dimensions.

The task data may also or alternatively indicate that the plurality of operations comprise a consumption operation comprising reading a final data value generated by the operation based on the output data (such as the final output tensor described above). The consumption operation is for example a downstream operation, downstream from the operation comprising generating the final data value within the directed graph. In such cases, the handling unit 720 can schedule execution of the consumption operation, by the execution circuitry, after generation of the final data value by the operation. For example, there may be a flag associated with the consumption operation within the task data that indicates that the consumption operation reads a pipe (or sub-pipe) that is produced using destination loopback. When this is set, the consumption operation may be triggered, e.g. scheduled for execution by the handling unit 720, once the last iteration of the destination loopback has been completed, and the final data value has been generated. The handling unit 720 can thus restrict the consumption operation from consuming the data stored in the physical storage location until the final data value has been generated, so that the consumption operation does not incorrectly read intermediate data stored in the physical storage location, representing an intermediate result of the operation.

After executing the consumption operation, the handling unit 720 may instruct the execution circuitry to re-use (e.g. re-read) the final data value stored in storage, such as in the plurality of storage elements. For example, the final data value may be re-used by at least one further consumption operation. The handling unit 720 may re-use the plurality of storage elements and/or the physical storage location after the final data value has been consumed by the consumption operation, for example if there are no other consumers of the final data value as represented by the task data. For example, the handling unit 720 may re-allocate the plurality of storage elements and/or the physical storage location to store a further output of a further operation of the operations represented by the task data, corresponding to a further logical storage location.

Source Loopback

To improve efficiency, input data for input to an operation such as the operations discussed above may be re-used. The input data may be generated by a prior operation within the directed graph, prior to the operation. The prior operation is for example executed at least partly prior to the operation so as to generate the input data for input to the operation. The prior operation may be immediately prior to the operation, so that the operation receives an output of the prior operation as the input data, or there may be at least one intervening operation between the prior operation and the operation within the directed graph. The re-use of input data may be coordinated by the handling unit 720. For example, the connections of the directed graph represented by the task data may comprise an input connection associated with the input data. In such cases, the handling unit 720 may allocate a plurality of input storage elements of an input physical storage location of the storage to correspond to an input logical storage location corresponding to the input data. For example, the handling unit 720 may track usage of the storage to identify appropriate input storage elements for storing the input data. The storage in which the input data is stored may be the same storage as that used for storing the output data, but with the input data allocated to be stored in different storage elements than the output data. For example, the input and output data may be stored in different sets of storage elements, such as different banks of buffers. In other cases, though, the storage may comprise different storage components for storing the input and output data. For example, the input data may be stored in the shared storage 730 and the output data may be stored in the accumulator buffer 736.

Figure 7:
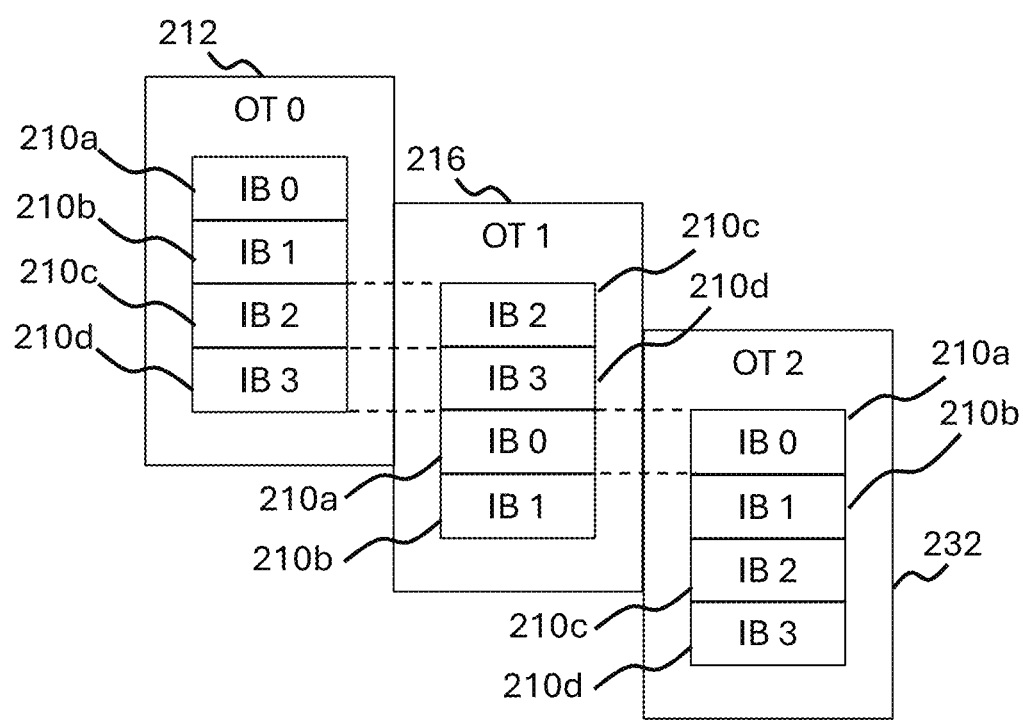
FIG. 7 is a schematic representation of re-use of input data according to an example.

FIG. 7 is a schematic representation of re-use of input data according to an example. In the example of FIG. 7, the handling unit 720 allocates a plurality of input storage elements for storing the input data, which may be similar to or the same as the storage elements 106-120 of FIG. 4. However, a combined size of the plurality of input storage elements is less than a size of the input data. In other words, the plurality of input storage elements is too small to store the entire input data at a given time. In the example of FIG. 7 (which is a simplified example), the input data is a set of first to fourth weight blocks 210*a*-210*d* of a first set of weight blocks 208*a* (labelled IB 0 to IB 3 in FIG. 7) for convolving with corresponding blocks of a set of input blocks of a tensor to generate respective blocks of an output tensor, in executing at least part of a neural network.

In this example, the plurality of input storage elements are too small to store all four weight blocks 210*a*-210*d* at the same time. The plurality of input storage elements in this case are two buffers, which in total are large enough to store two weight blocks at a time (with each input storage element storing a single weight block). This is a simplified example for ease of illustration, though, and in other cases more input storage elements may be allocated for storing input data and/or the plurality of input storage elements may be large enough to store more than two weight blocks at a time.

In the example of FIG. 7, after allocating the plurality of input storage elements to correspond to the input logical storage element, the handling unit 720 generates input location data indicative of a location of an input storage element of the plurality of input storage elements within the input physical storage location from which reading of the input data is to start for a given sub-operation of the operation (such as the first sub-operation of FIG. 5). For example, if the first weight block 210*a* is stored initially in the first storage element 106 of FIG. 4, the handling unit 720 generates input location data indicative of the location of the first storage element 106, which e.g. indicates a physical address of the first storage element 106 such as in the form of a pointer. The handling unit 720 then generates and sends execution instructions to the execution circuitry to instruct the execution circuitry to execute the given sub-operation (which may be referred to as a prior sub-operation).

In the example of FIG. 7, after convolving a weight block with a corresponding input block, the weight block is either evicted from the input storage element and replaced by another weight block or is re-used, and convolved with a different input block, as explained further below. In other cases, though, it is to be appreciated that the plurality of input storage elements may be sufficiently large to store each block of given input data (such as each weight block). In such cases, the input data may be processed according to the operation, to generate the output data (e.g. by convolving the weight blocks with corresponding blocks of a first set of input blocks of a tensor to generate respective blocks of an output tensor as described with reference to FIG. 5). In these cases, the input data may remain in the plurality of input storage elements after the output data is generated, rather than being evicted. The input data may then be convolved with a corresponding block of a second set of input blocks of the tensor to generate a second output tensor, e.g. as described with reference to FIG. 6. The input data may remain in the storage and be re-used repeatedly to generate successive intermediate output tensors. In such cases, the input data (such as the weight blocks) may correspond to a given row (or part thereof) of the second tensor 502 of FIGS. 5 and 6 (with each weight block corresponding to a given element of the row), and the first and second sets of input blocks may correspond to the first and second blocks of column 508 of the first tensor 500 of FIGS. 5 and 6.

In FIG. 7, after fetching and convolving the first to fourth weight blocks 210*a*-210*d* with corresponding blocks of a first set of input blocks to generate a first output tensor 212 (labelled OT 0 in FIG. 7), the third and fourth weight blocks 210*c*, 210*d* remain in the plurality of input storage elements. It is to be appreciated that fetching a particular weight block for example involves reading that weight block from storage, which may be further storage, which is external to the neural engine 700 comprising the execution circuitry configured to perform the convolutions of FIG. 7.

A convolution operation is associative, meaning that an acceptable result will be obtained even if the processing order is rearranged. Hence, the weight blocks 210*a*-210*d* can be convolved with corresponding blocks of a second set of input blocks out of order, in order to generate a second output tensor 216 (labelled OT 1 in FIG. 7), by execution of a second sub-operation. In this case, the third and fourth weight blocks 210*c*, 210*d* (which remain in the plurality of input storage elements after previously being used in executing the first sub-operation to generate the first output tensor 212) are convolved with corresponding blocks of the second set of input blocks before then fetching and convolving, in turn, the first and second weight blocks 210*a*, 210*b* with corresponding blocks of the second set of input blocks. Hence, in this example, the handling unit 720 allocates the plurality of input storage elements to store a respective portion of the input data at a time in executing the operation such that a final portion of the input data (the third and fourth weight blocks 210*c*, 210*d*) is stored in the plurality of input storage elements in executing a final portion of the first sub-operation. Executing the second sub-operation thus comprises re-reading of at least the final portion of the input data from the plurality of input storage elements.

It is to be appreciated that the processing of the second set of input blocks is also performed out of order (e.g. in a reordered manner) in this example. The generation of the first output tensor 212 involves fetching and convolving the first to fourth weight blocks 210*a*-210*d* with corresponding first to fourth blocks of the first set of input blocks. However, the generation of the second output tensor 216 involves fetching and convolving, in order, the third, fourth, first, second and third weight blocks 210c, 210d, 210a, 210b with the third, fourth, first and second blocks of the second set of input blocks.

In order to convolve the correct blocks with each other in generating the second output tensor 216, the handling unit 720 generates execution instructions to instruct the execution of the second sub-operation, which comprise the input location data. The input location data is indicative of the location of the input storage element from which reading of the input data started for execution of the prior sub-operation (e.g. the first operation to generate the first output tensor 212 in the example of FIG. 7). The execution instructions instruct the execution circuitry to, in executing the sub-operation, re-read at least part of the input data starting from an initial input storage element of the plurality of input storage elements determined based on the input location data. For example, the initial input storage element may be the same as the input storage element from which reading of the input data began for the execution of the prior sub-operation (but need not be). In an example in which successive blocks of the input data are stored in first and second input storage elements (and read from the first input storage element in executing the prior sub-operation), the input location data may indicate the address of the first input storage element, to cause the execution circuitry to re-read at least part of the input data starting from the first input storage element.

In examples such as this, the directed graph represented by the task data may comprise a second input connection associated with second input data for input to the operation, the second input connection corresponding to a second input logical storage location. In the example of FIG. 7, the second input data for example represents the set of input blocks of the tensor described above, which are to be convolved with the weight blocks 210a-210d.

The handling unit 720 in such cases allocates a second plurality of input storage elements of a second input physical storage location of the storage to correspond to the second input logical storage location. The second plurality of input storage elements are for example different storage elements of a different physical storage location than the plurality of input storage elements for storing the weight blocks 210a-210d (which may be referred to as a first plurality of input storage elements), which may be stored in a different set of buffers, such as a different bank of buffers and/or a different storage component than the plurality of input storage elements for storing the weight blocks 210a-210d.

The handling unit 720 generates second input location data indicative of a location of a particular input storage element of the second plurality of input storage elements from which reading of a portion of the second input data (e.g. a particular block of the set of blocks of the input tensor), for processing with a corresponding portion of the first input data (e.g. a corresponding weight block 210a-210d, is to start in executing the sub-operation (which is e.g. the second sub-operation, to generate the second output tensor 216). For example, the corresponding portion of the first input data may be a final portion of the first input data, which remains in the storage after executing the prior sub-operation (e.g. the third and fourth weight blocks 210c, 210d). In this example, the second input location data may indicate a location of the particular input storage element storing a block of the set of blocks of the input tensor to be convolved with the third weight block 210c, which for example corresponds to a start of the sub-operation. The execution instructions sent by the handling unit 720 to the execution circuitry to instruct the execution of the sub-operation comprise the second input location data to instruct the execution circuitry to read the portion of the second input data, starting from the particular input storage element, for processing with the corresponding portion (in this case, the final portion) of the first input data in executing the sub-operation.

After generating the first output tensor 212, an input storage element storing the third weight block 210c may be taken to correspond to the initial input storage element storing a start of the final portion of the input data, from which reading of the final portion (i.e. the third and fourth weight blocks 210c, 210d in this case) started for execution of the first sub-operation. In this example, executing the second sub-operation comprises re-reading of at least the final portion of the input data from the plurality of input storage elements (in this case, from the storage elements storing the third and fourth weight blocks 210c, 210d) starting from the start of the final portion if the input data (i.e. starting from the start of the third weight block 210c in this example). In this example, in executing the second sub-operation, the first and second weight blocks 210a, 210b are re-fetched from the further storage and stored in the plurality of input storage elements to overwrite the third and fourth weight blocks 210c, 210d, respectively, after the third and fourth weight blocks 210c, 210d have been read from the plurality of input storage elements.

This process can then be repeated to produce successive output tensors, which are successively accumulated with the data stored in the plurality of storage elements allocated to correspond to the logical storage location corresponding to the output of the operation. For example, the first and second weight blocks 210a, 210c are the final weight blocks which are processed (and stored in the plurality of input storage elements) to generate the second output tensor 216. Generation of a third output tensor 232 (labelled OT 2 in FIG. 7) thus starts with the convolution of the first and second weight blocks 210a, 210b with corresponding blocks of a third set of input blocks of the tensor, starting from the first weight block 210a, so as to take advantage of the fact that the first and second weight blocks 210a, 210b are already in the plurality of input storage elements. In other words, reading of the first and second weight blocks 210a, 210b from the further storage can be omitted in this case, and the first and second weight blocks 210a, 210b can instead be obtained from the plurality of input storage elements and convolved with corresponding blocks of the third set of input blocks. Processing then continues with fetching and convolving, in turn, the third and fourth weight blocks 210c, 210d with corresponding blocks of the third set of input blocks. Processing of blocks of successive sets of input blocks with corresponding weight blocks to generate successive output tensors for accumulation with the data stored in the plurality of storage elements continues in this manner until the output of the operation is generated (in this case, corresponding to the final output tensor).

The approach shown in FIG. 7 can reduce the number of memory accesses to the further storage, and may reduce the bandwidth for transferring input data to the input physical storage location. For example, the generation of the first output tensor 212 involves the fetching of four weight blocks (which involves reading from the further storage four times). However, only two weight blocks are fetched to generate subsequent output tensors, as the final two weight blocks for use in generation of the previous output tensor remains in the input physical storage location and is re-used, so that reading from the further storage is performed twice instead of four times.

It is to be appreciated that source loopback as described with reference to FIG. 7 may be used in conjunction with destination loopback as described with reference to FIGS. 5 and 6 or source loopback and destination loopback may each be used independently.

Tracking Storage Allocation

Figure 8:
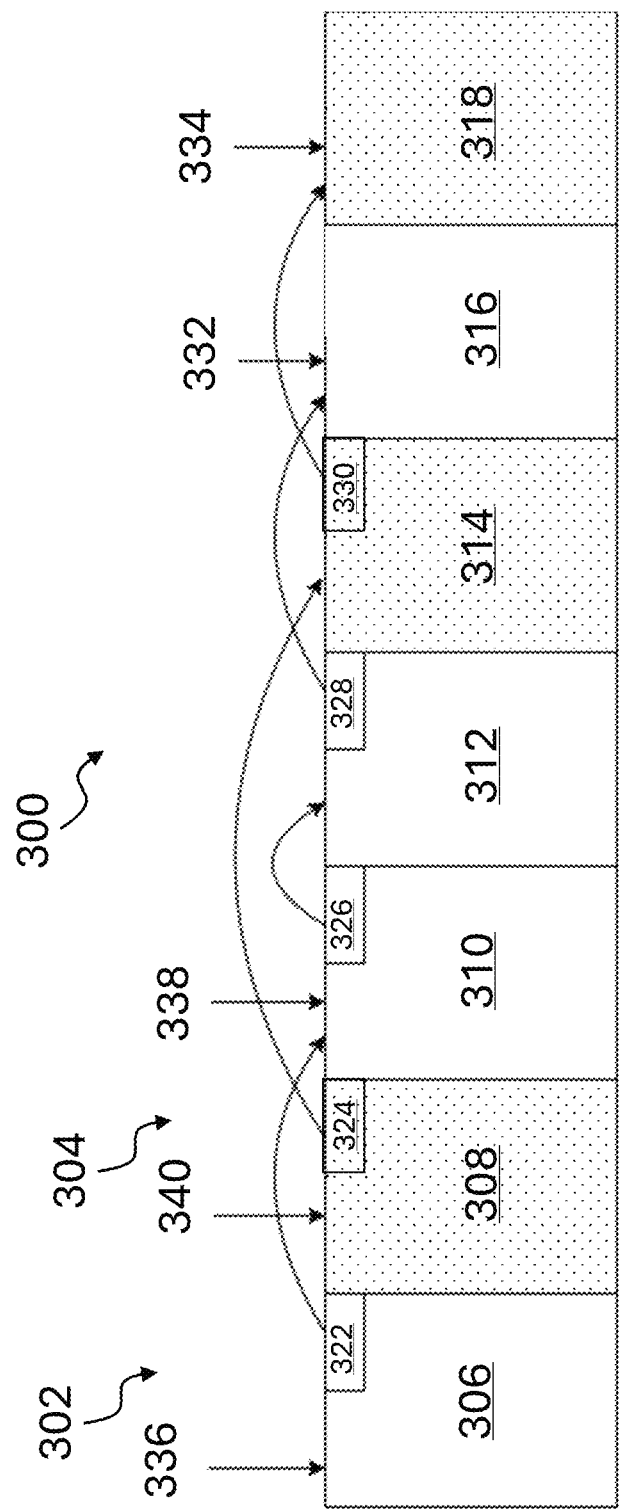
FIG. 8 is a schematic diagram illustrating linked lists for tracking storage allocation according to an example.

FIG. 8 shows an example of tracking of the usage of the storage elements 106-120 of FIG. 4, which may be used for allocating storage elements to store output data (or a portion thereof) corresponding to a given operation or sub-operation represented by the task data. in which at least one data structure 300 is used to track allocation of the storage elements 106-120 to the first and second sets of storage elements. In the example of FIG. 8, the at least one data structure 300 comprises a first linked list 302 and a second linked list 304. The first linked list 302 is used to track allocation of storage elements to the first set (corresponding to the first sub-pipe described above) and the second linked list 304 is used to track allocation of storage elements to the second set (corresponding to the second sub-pipe described above). The first linked list 302 includes entries 306, 310, 312, 316 corresponding to the storage elements 106, 110, 112, 116 of the first set, and the second linked list 304 includes entries 308, 314, 318 corresponding to the storage elements 108, 114, 118 of the second set. The entries 306, 310, 312, 316 of the first linked list 302 are shown unshaded and the entries 308, 314, 318 of the second linked list 304 are shown with dotted shading in FIG. 8.

The first and second linked lists 302, 304 are generated and populated by the handling unit 720 progressively, as the first and second operations are scheduled dynamically by the handling unit 720. The handling unit 720 dynamically schedules the first operation to sequentially write portions of the first output to respective storage elements of the first set in a first order, at least partly based on the usage tracked by the handling unit 720. The first order may be determined dynamically by the handling unit 720 based on which storage elements of the storage 100 are available as respective portions of the first output are generated (e.g. corresponding to respective blocks of a first output tensor such as the first output tensor 504 of FIG. 5). The first order may thus be generated progressively and added to over time with the generation of additional portions of the first order.

In this way, a first entry 306, a second entry 310, a third entry 312 and a fourth entry 316 are successively added to the first linked list 302 by the handling unit 720, respectively comprising location data indicative of a location of the first storage element 106, the third storage element 110, the fourth storage element 112 and the sixth storage element 316 in which successive blocks of the first output (to be generated successively after the initial block of the first output) are to be stored. Similarly, a first entry 308, a second entry 314 and a third entry 318 are successively added to the second linked list 304 by the handling unit 720, respectively comprising location data indicative of a location of the second storage element 108, the fifth storage element 114 and the seventh storage element 118 in which successive blocks of the second output (to be generated successively after the initial block of the second output) are to be stored. The location data may be the same as the location data described in other examples herein, and may be comprised by execution instructions generated by the handling unit 720 to instruct execution of at least one further operation (or sub-operation) comprising reading of data stored at a given storage element represented by a given location of given location data.

The first linked list 302 may be considered order data that is indicative of a first order in which the respective portions of the first output (in this case, corresponding to respective blocks of the first output) are written to the respective storage elements of the first set. In other words, the first order in this case is represented as the first linked list 302. The second linked list may similarly be considered order data indicative of a second order in which respective blocks of the second output are written to the respective storage elements of the second set.

In FIG. 8, the first linked list 302 comprises pointers 322, 326, 328 for respective storage elements of the first set such that a given pointer for a given storage element of the first set points to a location of a successive storage element of the first set, to be written to (or read from) successively after the given storage element, according to the first order. A given pointer for a particular entry of the first linked list 302 for example points to a successive entry of the first linked list 302, which comprises successive location data indicative of a physical storage location of the successive storage element to be written to (or read from) successively after the storage element associated with the given pointer. The given pointer thus points to the location data for the successive storage element by pointing to the successive entry within the first linked list 302 (comprising the location data for the successive storage element). For example, the first entry 306 of the first linked list 302 comprises first location data indicative of a physical storage location of the first storage element 106, as well as a first pointer 322 to the second entry 310 of the first linked list 302, which comprises successive location data indicative of a physical storage location of a successive storage element to be written to (or read from) successively (e.g. consecutively) after the first storage element 106 in executing the first operation. In this case, the successive location data of the second entry 310 of the first linked list 302 is indicative of the physical storage location of the third storage element 110 of the first storage unit 102. Similarly, the second entry 310 of the first linked list 302 comprises a pointer 326 to a third entry 312 of the first linked list 302. The third entry 312 of the first linked list 302 comprises a pointer 328 to a fourth entry 316 of the first linked list 302. The fourth entry 316 of the first linked list 302 is the final entry of the first linked list 302 at the time illustrated in FIG. 8 and thus does not comprise a pointer to a subsequent entry.

The second linked list 304 also comprises pointers 324, 330 for respective storage elements of the second set such that a given pointer for a given storage element of the second set points to a location of a successive storage element of the second set, to be written to (or read from) successively after the given storage element, according to the second order. In FIG. 8, the first entry 308 of the second linked list 304 comprises a pointer 324 to the second entry 314 of the second linked list 304, and the second entry 314 of the second linked list 304 comprises a pointer 330 to the third entry 318 of the second linked list 304. The third entry 318 of the second linked list 304 is the final entry of the of the second linked list 304 at the time illustrated in FIG. 8 and thus does not comprise a pointer to a subsequent entry.

The handling unit 720 may also or instead generate various control data on a per buffer basis (i.e. for each storage element of the storage unit 102) and a per sub-pipe basis, which may be used in storage allocation and/or in instructing reading of particular data from a particular physical storage location. The per buffer control data may be referred to herein as storage element characteristic data for a given storage element, and the per sub-pipe control data may be referred to herein as operation characteristic data. For example, the storage element characteristic data for a given storage element may indicate whether the storage element is allocated to a particular sub-pipe, the sub-pipe to which the storage element is allocated, whether the storage element is available to be written to and/or whether the storage element is storing valid data to be read by a consumption operation (e.g. on a per consumption operation basis). The operation characteristic data may indicate the sub-pipes for a given multi-pipe, a destination storage pipe for storing an output of a consumption operation of a given sub-pipe, and/or whether the destination storage pipe is available to be written to by the consumption operation of the given sub-pipe.

To track usage of the storage elements 106-120, the handling unit 720 may track a head and/or a tail of at least a portion of the at least one data structure 300 such as the first and/or second linked list 302, 304. The at least one data structure 300 is updated over time during use of the storage. It is to be appreciated that the entries of a linked list, such as the first or second linked lists 302, 304 of FIG. 8, may comprise at least a portion of the control data as discussed above. For example, a given entry may comprise per buffer control data for a storage element corresponding to the given entry. In such cases, the handling unit 720 updates the control data stored in the linked list as storage elements are allocated to respective sub-pipes, as data within respective storage elements is consumed by consumption operation(s), and so forth.

The usage tracked by the handling unit 720 may be used by the handling unit 720 to allocate storage element(s) for storing data, such as block(s), generated in executing a task and/or in scheduling consumption operations comprising reading of at least a portion of data stored in the storage, such as at least one of the blocks The handling unit 720 may utilize the tracked usage, e.g. represented by the at least one data structure 300 and/or the control data, to instruct re-reading and/or updating of at least a portion of data stored in the storage, as described above with reference to FIGS. 5 to 7. For example, a linked list generated by the handling data 720 may allow the physical storage location for different respective portions of data (such as different blocks) of outputs of different operations to be readily identified. This can facilitate updating (or re-reading) of the data before it is overwritten or otherwise removed from the storage.

A set of location data indicative of respective physical storage locations for storing data generated in executing a task can be traversed, e.g. by traversing a linked list such as the first or second linked lists 302, 304 of FIG. 8, by the handling unit 720 to identify the physical storage location of a particular storage element, as represented by the location data, from which to start updating or re-reading data (e.g. in an order defined by an order of entries of the linked list). For example, the entry of the linked list corresponding to the initial storage element from to start updating data is to begin can be identified by the handling unit 720. The handling unit 720 can obtain the location data from this entry, and use the location data to instruct the execution circuitry to update the data stored at that initial storage element (e.g. by accumulation of newly-generated data as described with reference to FIG. 6). The handling unit 720 can then traverse the linked list to the next entry, consecutively after the entry corresponding to the initial storage element, to identify the location of the next storage element for which data is to be updated. The handling unit 720 can then obtain location data from the next entry, and use the location data from the next entry to instruct the execution circuitry to update the data stored at the next storage element. Traversal of the linked list by the handling unit 720, and successive updating of the data stored at respective storage elements corresponding to respective entries of the linked list, in the order defined by the linked list, can continue until a desired output is obtained, e.g. the final output tensor described above with reference to FIGS. 5 and 6. In this way, the physical storage location for particular data can be identified in a flexible manner so that particular data can be updated and/or re-read as desired.

Programs and Systems for Implementing Examples Herein

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

Concepts described herein may be embodied in a system comprising at least one packaged chip. In some cases, the processor described earlier may be implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
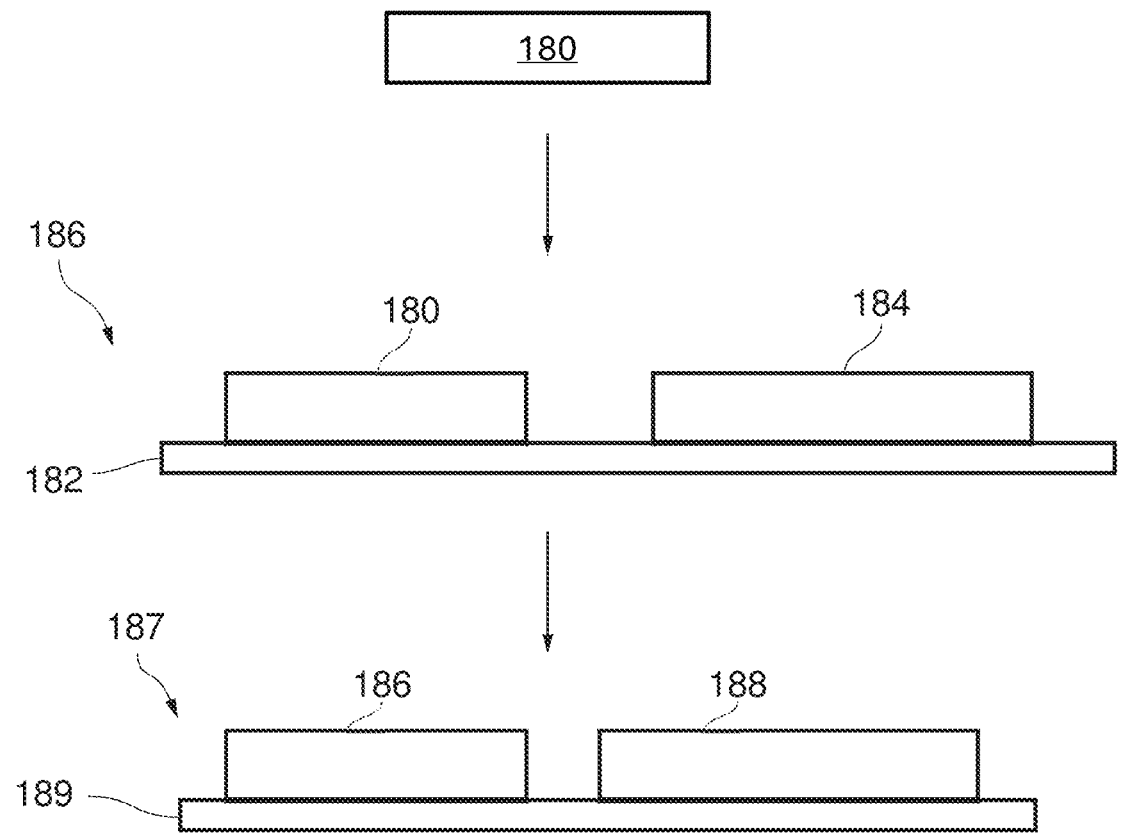
FIG. 9 is a schematic diagram of manufacture of a system and a chip-containing product.

As shown in FIG. 9, one or more packaged chips 180, with the processor described above implemented on one chip or distributed over two or more of the chips, are manufactured by a semiconductor chip manufacturer. In some examples, the chip product 180 made by the semiconductor chip manufacturer may be provided as a semiconductor package which comprises a protective casing (e.g. made of metal, plastic, glass or ceramic) containing the semiconductor devices implementing the processor described above and/or connectors, such as lands, balls or pins, for connecting the semiconductor devices to an external environment. Where more than one chip 180 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 180 are assembled on a board 182 together with at least one system component 184 to provide a system 186. For example, the board may comprise a printed circuit board. The board substrate may be made of any of a variety of materials, e.g. plastic, glass, ceramic, or a flexible substrate material such as paper, plastic or textile material. The at least one system component 184 comprise one or more external components which are not part of the one or more packaged chip(s) 180. For example, the at least one system component 184 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 187 is manufactured comprising the system 186 (including the board 182, the one or more chips 180 and the at least one system component 184) and one or more product components 188. The product components 188 comprise one or more further components which are not part of the system 187. As a non-exhaustive list of examples, the one or more product components 188 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 187 and one or more product components 188 may be assembled on to a further board 189.

The board 182 or the further board 189 may be provided on or within a device housing or other structural support (e.g. a frame or blade) to provide a product which can be handled by a user and/or is intended for operational use by a person or company.

The system 186 or the chip-containing product 187 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further Examples

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples are envisaged.

In examples above, the handling unit 720 performs the allocation of storage elements to logical storage locations and the scheduling of operations for execution by the neural engine 700. However, in other examples, a different component of a processor than the handling unit 720 may perform at least one of these aspects. For example, at least one of these aspects may be performed by the command and control module 710, alone or in combination with the handling unit 720.

In FIG. 7, the plurality of input storage elements are too small to store an entirety of the input data at a time. However, in other examples, the plurality of input storage elements are sufficiently large to store the entirety of the input data at a time. In such cases, the initial input storage element from which re-reading of the input data starts for a sub-operation (subsequent to a prior sub-operation) may store a start of the input data, from which reading of the input data started in executing the prior sub-operation. For example, the entirety of the input data may be re-read in the sub-operation, starting from the beginning of the input data.

It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

Further examples are set out in the following numbered clauses:

1. A processor comprising:
    storage;
    execution circuitry; and
    a handling unit configured to:
        obtain task data that describes a task to be executed, the task comprising a plurality of operations representable as a directed graph of operations comprising operations connected by connections corresponding to respective logical storage locations, such that a connection associated with an output of an operation of the operations corresponds to a logical storage location;
        allocate a plurality of storage elements of a physical storage location of the storage to correspond to the logical storage location;
        generate location data indicative of a location of a given storage element of the plurality of storage elements within the physical storage location;
        generate execution instructions, comprising the location data, to instruct the execution circuitry to, after execution of a prior sub-operation of the operation comprising storing prior data in the physical storage location:
            execute a sub-operation of the operation to generate output data; and
            use the output data to update data stored within respective storage elements of the plurality of storage elements according to a predefined order, starting from an initial storage element of the plurality of storage elements determined based on the location data, so as to update the prior data stored in the physical storage location using the output data; and
        send the execution instructions to the execution circuitry.

2. The processor of clause 1, wherein the handling unit is configured to generate prior execution instructions, comprising the location data, to instruct the execution circuitry to:
    execute the prior sub-operation to generate the prior data and to write the prior data to the respective storage elements of the plurality of storage elements according to the predefined order, starting from the initial storage element.

3. The processor of clause 2, wherein the execution circuitry is configured to:
    based on the prior execution instructions, execute the prior sub-operation to generate the prior data and to write the prior data to the respective storage elements of the plurality of storage elements according to the predefined order, starting from the initial storage element, such that writing of the prior data ends with writing a final portion of the prior data to a final storage element.

4. The processor of any one of clauses 1 to 3, wherein two of the plurality of storage elements to be written to successively according to the predefined order are non-contiguous with each other within the physical storage location.

5. The processor of any one of clauses 1 to 4, wherein the initial storage element is the given storage element with the location indicated by the location data.

6. The processor of any one of clauses 1 to 5, wherein to update the prior data stored in the physical storage location comprises accumulation of the prior data with the output data.

7. The processor of any one of clauses 1 to 6, wherein the operation comprises a plurality of sub-operations, comprising the sub-operation and the prior sub-operation, each corresponding to a respective loop over a dimension of a multi-dimensional nested loop, wherein the task data is indicative of the dimension.

8. The processor of clause 7, wherein the multi-dimensional nested loop represents a tensor outer product of at least a first tensor and a second tensor.

9. The processor of any one of clauses 1 to 8, wherein the task data is indicative that the plurality of operations comprise a consumption operation comprising reading a final data value generated by the operation based on the output data, and the handling unit is configured to schedule execution of the consumption operation, by the execution circuitry, after generation of the final data value by the operation.

10. The processor of any one of clauses 1 to 9, wherein the connections comprise an input connection associated with input data for input to the operation, the input connection corresponding to an input logical storage location, wherein the handling unit is configured to:
    allocate a plurality of input storage elements of an input physical storage location of the storage to correspond to the input logical storage location;
    generate input location data indicative of a location of an input storage element of the plurality of input storage elements within the input physical storage location from which reading of the input data started for execution of the prior sub-operation,
    wherein the execution instructions comprise the input location data to instruct the execution circuitry to, in executing the sub-operation, re-read at least part of the input data starting from an initial input storage element of the plurality of input storage elements determined based on the input location data.

11. The processor of clause 10, wherein the handling unit is configured to allocate the plurality of input storage elements of the input physical storage location to store a respective portion of the input data at a time in executing the operation such that a final portion of the input data is stored in the plurality of input storage elements in executing a final portion of the prior sub-operation, and executing the sub-operation comprises re-reading of at least the final portion of the input data from the plurality of input storage elements.

12. The processor of clause 10 or clause 11, wherein the input data is generated by a prior operation within the directed graph, prior to the operation.

13. A system comprising:
the processor of any one of clauses 1 to 12, implemented in at least one packaged chip;
at least one system component; and
a board,
wherein the at least one packaged chip and the at least one system component are assembled on the board.

14. A chip-containing product comprising the system of clause 13, wherein the system is assembled on a further board with at least one other product component.

15. A non-transitory computer-readable medium having stored thereon computer-readable code for fabrication of the processor of any one of clauses 1 to 12.

16. A processor comprising:
storage;
execution circuitry; and
a handling unit configured to:
obtain task data that describes a task to be executed, the task comprising a plurality of operations representable as a directed graph of operations comprising operations connected by connections corresponding to respective logical storage locations, such that an input connection associated with input data for input to an operation of the operations corresponds to an input logical storage location;
allocate a plurality of input storage elements of an input physical storage location of the storage to correspond to the input logical storage location;
generate input location data indicative of a location of an input storage element of the plurality of input storage elements within the input physical storage location from which reading of the input data started for execution of a prior sub-operation of the operations, prior to a sub-operation of the operations;
generate execution instructions, comprising the input location data, to instruct the execution circuitry to, after execution of the prior sub-operation, execute the sub-operation comprising re-reading of at least part of the input data starting from an initial input storage element of the plurality of input storage elements determined based on the input location data; and
send the execution instructions to the execution circuitry.

17. The processor of clause 16, wherein the input data is generated by a prior operation within the directed graph, prior to the operation.

18. The processor of clause 16 or clause 17, wherein the initial input storage element is the input storage element with the location indicated by the input location data.

19. The processor of any one of clauses 16 to 18, wherein the handling unit is configured to allocate the plurality of input storage elements of the input physical storage location to store a respective portion of the input data at a time in executing the operation such that a final portion of the input data is stored in the plurality of input storage elements in executing a final portion of the prior sub-operation, and executing the sub-operation comprises re-reading of at least the final portion of the input data from the plurality of input storage elements.

20. The processor of clause 19, wherein the initial input storage element stores a start of the final portion of the input data from which reading of the final portion of the input data started for execution of the prior sub-operation, such that executing the sub-operation comprises re-reading of at least the final portion of the input data from the plurality of input storage elements starting from the start of the final portion of the input data.

21. The processor of clause 19 or clause 20, wherein the connection is a first input connection, the input data is first input data, the input logical storage location is a first input logical storage location, the input physical storage location is a first input physical storage location, the plurality of input storage elements is a first plurality of input storage elements, the location data is first input location data, the connections comprise a second input connection associated with second input data for input to the operation, and the second input connection corresponds to a second input logical storage location, wherein the handling unit is configured to:
allocate a second plurality of input storage elements of a second input physical storage location of the storage to correspond to the second input logical storage location; and
generate second input location data indicative of a location of a particular input storage element of the second plurality of input storage elements from which reading of a portion of the second input data, for processing with the final portion of the first input data, is to start in executing the sub-operation,
wherein the execution instructions comprise the second input location data to instruct the execution circuitry to read the portion of the second input data, starting from the particular input storage element, for processing with the final portion of the first input data in executing the sub-operation.

22. The processor of any one of clauses 19 to 21, wherein a combined size of the plurality of input storage elements is less than a size of the input data.

What is claimed is:
1. A processor comprising:
storage;
execution circuitry; and
a handling unit configured to:
obtain task data that describes a task to be executed, the task comprising a plurality of operations representable as a directed graph of operations comprising operations connected by connections corresponding to respective logical storage locations, such that a connection associated with an output of an operation of the operations corresponds to a logical storage location;
allocate a plurality of storage elements of a physical storage location of the storage to correspond to the logical storage location;
generate location data indicative of a location of a given storage element of the plurality of storage elements within the physical storage location;
generate execution instructions, comprising the location data, to instruct the execution circuitry to, after execution of a prior sub-operation of the operation comprising storing prior data in the physical storage location:
  execute a sub-operation of the operation to generate output data; and
  use the output data to update data stored within respective storage elements of the plurality of storage elements according to a predefined order, starting from an initial storage element of the plurality of storage elements determined based on the location data, so as to update the prior data stored in the physical storage location using the output data; and
  send the execution instructions to the execution circuitry.

2. The processor of claim 1, wherein the handling unit is configured to generate prior execution instructions, comprising the location data, to instruct the execution circuitry to:
  execute the prior sub-operation to generate the prior data and to write the prior data to the respective storage elements of the plurality of storage elements according to the predefined order, starting from the initial storage element.

3. The processor of claim 2, wherein the execution circuitry is configured to:
  based on the prior execution instructions, execute the prior sub-operation to generate the prior data and to write the prior data to the respective storage elements of the plurality of storage elements according to the predefined order, starting from the initial storage element, such that writing of the prior data ends with writing a final portion of the prior data to a final storage element.

4. The processor of claim 1, wherein two of the plurality of storage elements to be written to successively according to the predefined order are non-contiguous with each other within the physical storage location.

5. The processor of claim 1, wherein the initial storage element is the given storage element with the location indicated by the location data.

6. The processor of claim 1, wherein to update the prior data stored in the physical storage location comprises accumulation of the prior data with the output data.

7. The processor of claim 1, wherein the operation comprises a plurality of sub-operations, comprising the sub-operation and the prior sub-operation, each corresponding to a respective loop over a dimension of a multi-dimensional nested loop, wherein the task data is indicative of the dimension.

8. The processor of claim 7, wherein the multi-dimensional nested loop represents a tensor outer product of at least a first tensor and a second tensor.

9. The processor of claim 1, wherein the task data is indicative that the plurality of operations comprise a consumption operation comprising reading a final data value generated by the operation based on the output data, and the handling unit is configured to schedule execution of the consumption operation, by the execution circuitry, after generation of the final data value by the operation.

10. The processor of claim 1, wherein the connections comprise an input connection associated with input data for input to the operation, the input connection corresponding to an input logical storage location, wherein the handling unit is configured to:
  allocate a plurality of input storage elements of an input physical storage location of the storage to correspond to the input logical storage location;
  generate input location data indicative of a location of an input storage element of the plurality of input storage elements within the input physical storage location from which reading of the input data started for execution of the prior sub-operation,
  wherein the execution instructions comprise the input location data to instruct the execution circuitry to, in executing the sub-operation, re-read at least part of the input data starting from an initial input storage element of the plurality of input storage elements determined based on the input location data.

11. The processor of claim 10, wherein the handling unit is configured to allocate the plurality of input storage elements of the input physical storage location to store a respective portion of the input data at a time in executing the operation such that a final portion of the input data is stored in the plurality of input storage elements in executing a final portion of the prior sub-operation, and executing the sub-operation comprises re-reading of at least the final portion of the input data from the plurality of input storage elements.

12. A system comprising:
  the processor of claim 1, implemented in at least one packaged chip;
  at least one system component; and
  a board,
  wherein the at least one packaged chip and the at least one system component are assembled on the board.

13. A chip-containing product comprising the system of claim 12, wherein the system is assembled on a further board with at least one other product component.

14. A non-transitory computer-readable medium having stored thereon computer-readable code for fabrication of the processor of claim 1.

15. A processor comprising:
  storage;
  execution circuitry; and
  a handling unit configured to:
    obtain task data that describes a task to be executed, the task comprising a plurality of operations representable as a directed graph of operations comprising operations connected by connections corresponding to respective logical storage locations, such that an input connection associated with input data for input to an operation of the operations corresponds to an input logical storage location;
    allocate a plurality of input storage elements of an input physical storage location of the storage to correspond to the input logical storage location;
    generate input location data indicative of a location of an input storage element of the plurality of input storage elements within the input physical storage location from which reading of the input data started for execution of a prior sub-operation of the operations, prior to a sub-operation of the operations;
    generate execution instructions, comprising the input location data, to instruct the execution circuitry to, after execution of the prior sub-operation, execute the sub-operation comprising re-reading of at least part of the input data starting from an initial input storage element of the plurality of input storage elements determined based on the input location data; and
    send the execution instructions to the execution circuitry.

16. The processor of claim 15, wherein the initial input storage element is the input storage element with the location indicated by the input location data.

17. The processor of claim 15, wherein the handling unit is configured to allocate the plurality of input storage elements of the input physical storage location to store a respective portion of the input data at a time in executing the operation such that a final portion of the input data is stored in the plurality of input storage elements in executing a final portion of the prior sub-operation, and executing the sub-operation comprises re-reading of at least the final portion of the input data from the plurality of input storage elements.

18. The processor of claim 17, wherein the initial input storage element stores a start of the final portion of the input data from which reading of the final portion of the input data started for execution of the prior sub-operation, such that executing the sub-operation comprises re-reading of at least the final portion of the input data from the plurality of input storage elements starting from the start of the final portion of the input data.

19. The processor of claim 17, wherein the connection is a first input connection, the input data is first input data, the input logical storage location is a first input logical storage location, the input physical storage location is a first input physical storage location, the plurality of input storage elements is a first plurality of input storage elements, the location data is first input location data, the connections comprise a second input connection associated with second input data for input to the operation, and the second input connection corresponds to a second input logical storage location, wherein the handling unit is configured to:

allocate a second plurality of input storage elements of a second input physical storage location of the storage to correspond to the second input logical storage location; and generate second input location data indicative of a location of a particular input storage element of the second plurality of input storage elements from which reading of a portion of the second input data, for processing with the final portion of the first input data, is to start in executing the sub-operation, wherein the execution instructions comprise the second input location data to instruct the execution circuitry to read the portion of the second input data, starting from the particular input storage element, for processing with the final portion of the first input data in executing the sub-operation.

20. The processor of claim 17, wherein a combined size of the plurality of input storage elements is less than a size of the input data.

* * * * *